United States Patent [19]

Klein

[11] Patent Number: 4,822,114
[45] Date of Patent: Apr. 18, 1989

[54] BRAKING PRESSURE MODULATOR

[75] Inventor: Hans-Christof Klein, Hattersheim, Fed. Rep. of Germany

[73] Assignee: Alfred Teves GmbH, Frankfurt am Main, Fed. Rep. of Germany

[21] Appl. No.: 202,072

[22] Filed: Jun. 3, 1988

[30] Foreign Application Priority Data

Jun. 5, 1987 [DE] Fed. Rep. of Germany ....... 3718973
Jun. 5, 1987 [DE] Fed. Rep. of Germany ....... 3718955

[51] Int. Cl.[4] .................. B60T 8/32; B60T 8/42; B60T 13/66
[52] U.S. Cl. .................. 303/115; 303/100; 303/119
[58] Field of Search ............ 303/115, 113, 114, 116, 303/119, 118, 117, 61–63, 68–69, 100, 24.1; 188/181, 355–359, 360

[56] References Cited

U.S. PATENT DOCUMENTS

| | | | |
|---|---|---|---|
| 4,002,376 | 1/1977 | Kondo et al. | 303/115 |
| 4,063,785 | 12/1977 | Tribe | 303/115 |
| 4,066,301 | 1/1978 | Harries | 303/115 |
| 4,072,365 | 2/1978 | Pauwels | 303/61 X |
| 4,095,851 | 6/1978 | Ando et al. | 303/119 X |
| 4,131,326 | 12/1978 | Takayama et al. | 303/115 |
| 4,269,456 | 5/1981 | Kondo et al. | 303/115 |
| 4,637,661 | 1/1987 | Kohno | 303/24.1 |
| 4,714,301 | 12/1987 | Farr | 303/115 X |
| 4,750,790 | 6/1988 | Klein | 303/115 |
| 4,767,163 | 8/1988 | Cotignoli | 303/115 X |

*Primary Examiner*—Douglas C. Butler
*Attorney, Agent, or Firm*—James B. Raden

[57] ABSTRACT

A braking pressure modulator is disclosed including a gear unit which is interposed between its actuator and a volume-receiving unit and whose transmission varies in dependence upon the stroke of a displacement member or plunger in the volume-receiving unit. To this end, the gear unit is designed such that the hydraulic forces urging the displacement member or plunger in a shift-out direction remain in balance with a constant predefined adjusting force of the actuator when the displacement member or plunger is shifted out after attainment of a predetermined maximum pressure in the volume-receiving unit and with a hydraulic separating valve closed. To control the plunger strokes, only small changes in the adjusting force of the actuator are required. In one embodiment, the actuator of the braking pressure modulator is an electric motor.

31 Claims, 11 Drawing Sheets

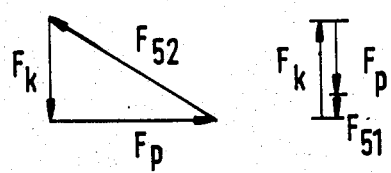
FIG. 3
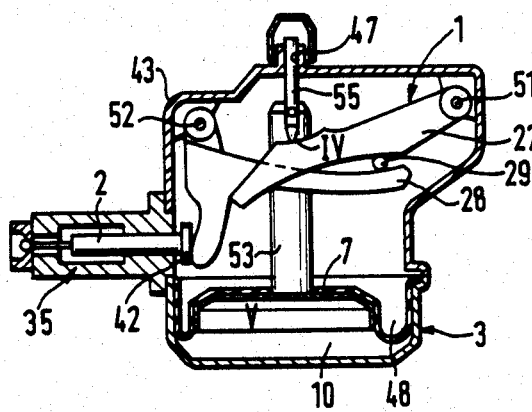
FIG. 4
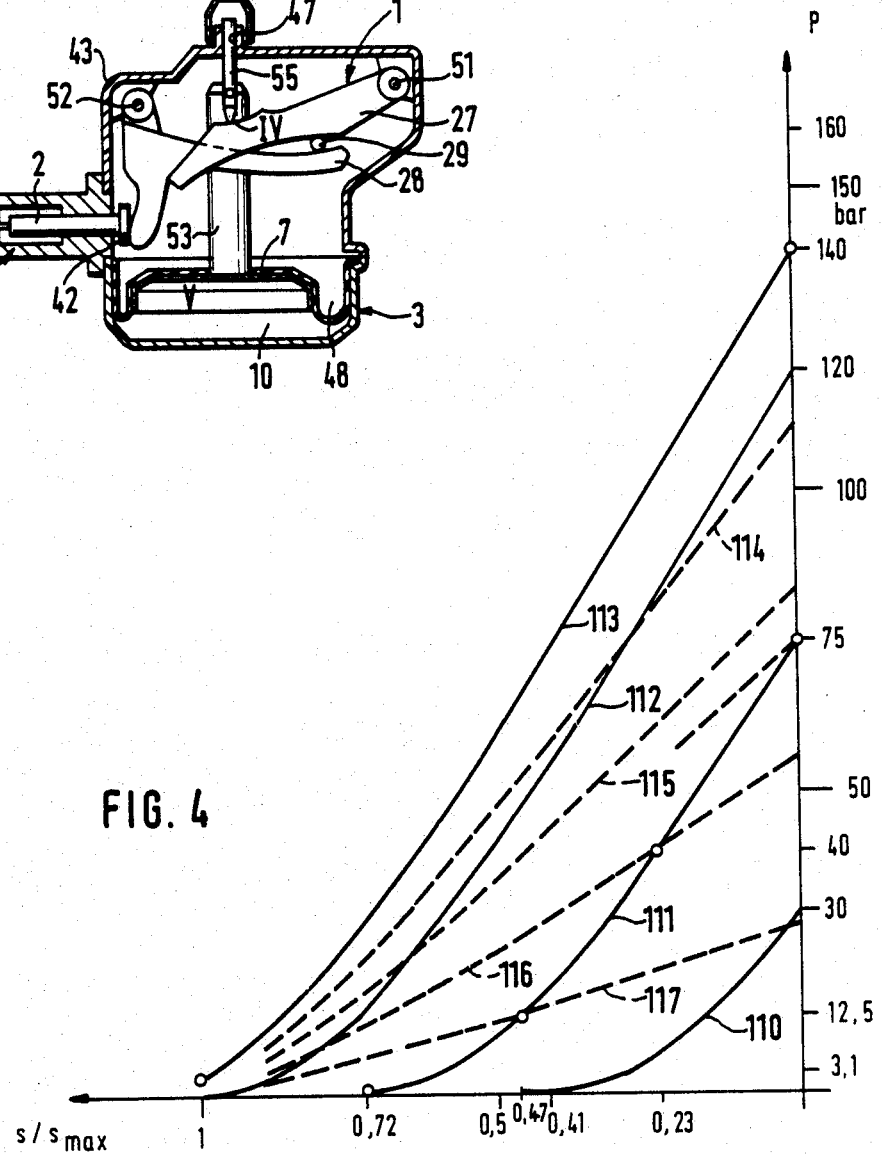

|  |  | $\Delta P_V / \Delta P_{\alpha V}$ | |
|---|---|---|---|
|  |  | — | — |
|  | 0 | 1 | 0 |
|  | 75 | 1 | 0 |
|  | 75 | 0,54 | 0 |
|  | 40 | 0,40 | 0,23.5 |
|  | 12 5 | 0,20 | 0,46.5 |
|  | 0 | 0 | 0,72.2 |

FIG. 5

|   | P1 | P2 | P3 | P4 |
|---|----|----|----|----|
| 1 | $P_R$ | $P_{Hz}$ | $P_V$ | $P_L$ |
| 2 | $P_{Rz}$ | $P_{Hz}$ | $P_V$ | $P_{AV}$ |
| 3 | $P_{Rz}$ | — | $P_V$ | $P_L$ |
| 4 | $P_{Rz}$ | — | $P_V$ | $P_{AV}$ |
| 5 | — | $P_{Rz}$ | $P_L$ | $P_V$ |
| 6 | — | $P_{Rz}$ | $P_V$ | $P_{AV}$ |

BRAKING PRESSURE MODULATOR

BACKGROUND OF THE INVENTION

The present invention relates to a braking pressure modulator of the type comprising a volume-receiving unit which is designed as a displacement-type or plunger system, whose displacement or plunger working chamber is interposed or adpated to be interposed between a master brake cylinder or the like and a wheel brake cylinder or the like of a brake system and which is further adapted to be uncoupled from the master brake cylinder or the like by a separating valve which closes automatically when the displacement member or plunger has been shifted in the working chamber for the purpose of modulating the pressure in the working chamber and wheel brake cylinder or the like. The system to which the invention relates further includes an actuator having an adjusting member that is coupled to the displacement member or plunger by way of a gear unit that is transmission responsive to the regulating distance. The adjusting member is engaged for being driven with a piston and diaphragm assembly. The adjusting member will generate an adjusting force that is dependent on the difference in pressure across the piston and diaphragm.

Braking pressure modulators are an essential component part of brake systems with anti-lock apparatus. As soon as slip sensors assigned to the vehicle wheels detect a locking wheel during braking of the vehicle, the braking pressure modulator associated with that wheel will be actuated. That is, the displacement member or plunger of the volume-receiving unit connected upstream from the wheel brake cylinder of the locking wheel will be adjusted in a direction for shifting the displacement member or plunger out of the working chamber while the separating valve automatically isolates the working chamber and thus also isolates the respective wheel brake cylinder from the master brake cylinder. The pressure in the working chamber as well as in the wheel brake cylinder will decrease more or less exponentially in dependence on the stroke of the displacement member or plunger. As a result, the brake force acting upon the locking wheel will be correspondingly reduced and the wheel will begin to rotate again when the brake force is reduced sufficiently. Subsequently, the displacement member or plunger is again shifted into the working chamber of the volume-receiving unit until the wheel starts to lock again and the separating valve opens again when the plunger or displacement member has reassumed its in or end position in the working chamber. The action described above will be successively repeated as needed.

The power consumption in conventional braking pressure modulators is relatively great. This is not desirable in principle because normally this power must be generated by the vehicle engine and thus is not at disposal for the vehicle's movement. Moreover, it has to be taken into account that the adjusting forces necessary for adjusting the displacement member or plunger of the volume-receiving unit are usually produced by utilizing the vacuum of the internal-combustion engine driving the vehicle. It can be expected from future engine developments, however, that utilizable engine vacuum will be reduced.

SUMMARY OF THE INVENTION

Therefore, it is the object of the present invention to devise a braking pressure modulator which is characterized by relatively small overall dimensions, which lends itself to being controlled with particularly little power and which is actuatable both electromechanically and directly mechanically.

This object is achieved by a braking pressure modulator according to the invention wherein the transmission of the gear unit varies in a manner, in particular exponentially, such that the defined adjusting force which can be generated by a predetermined differential pressure for urging the displacement member or plunger in the direction of its one end position, hereinafter referred to as the in position or in direction. Also the pressure forces for urging the displacement member or plunger in the working chamber in the direction of its other end position, hereinafter referred to as the out position or out direction, will remain substantially in a condition of balance irrespective of the position of the displacement member or plunger when the displacement member or plunger moves from the in end position in the out direction upon a maximum pressure being attained in the working chamber and the separating valve having closed.

Since the constructively defined adjusting force and the forces generated by the pressure in the volume-receiving unit and acting upon the displacement member or plunger will always remain in balance to one another when the displacement member or plunger is readjusted after the separating valve has closed upon attainment of the maximum pressure, extremely low forces will be sufficient to readjust the displacement member or plunger such forces only need to overcome the friction in the pressure modulator and, more particularly, in the gear unit. Advantageously, the constructively defined adjusting force of the actuator for actuation of the modulator needs to be changed only very slightly when, upon the occurrence of a panic stop, the maximum pressure in the working chamber of the modulator and thus at the wheel brake cylinder is reached and results in locking of the braked wheel. However, should the wheel lock prior to attainment of the maximum pressure thus requiring the braking pressure modulator to function in the presence of a lower initial pressure, the adjusting force may be controlledly reduced below the constructively defined adjusting force in order to permit the displacement member of plunger to move in its out direction to thereby decrease the pressure at the wheel brake cylinder of the locking wheel until the wheel starts to rotate again. In this event, very low control forces are sufficient because the adjusting force permits control with the least energy consumption. A control valve assembly provides for the differential pressure acting upon the piston and diaphragm assembly to be variable between an infinitely low differential pressure and a value being slightly the excess of the constructively defined differential pressure.

Accordingly, an advantageous feature provides for the piston and diaphragm assembly, one side of which is constantly exposed to atmospheric pressure to close a chamber arranged on its other side which is connected or connectable with a pressure or vacuum source. The chamber is connectable with the atmosphere by way of a control valve for controlling the chamber pressure.

Serving as a control valve is a three-way/three-position directional control valve having a port for the chamber, a port for the atmospheric air as well as a port for the vacuum or pressure source. The chamber is isolated from the atmosphere as well as from the vacuum or pressure source in one switch position, while it is connected either to the vacuum or pressure source or to the atmosphere in the two other switch positions.

The control member of the control valve is coupled directly with an actuating drive, e.g., an electromagnet. The variation of the differential pressure at the diaphragm and piston assembly of the actuator, which variation is achieved by the control valve, changes the actuator's adjusting force. As a consequence thereof, the displacement member of plunger of the volume-receiving unit moves to assume a position which corresponds to the varied adjusting force and which, besides depending on the adjusting force, depends on the initial pressure prevailing in the volume-receiving unit upon closing of the separating valve.

According to a particularly preferred embodiment of the invention, means are provided to regulate the differential pressure at the diaphragm and piston assembly of the actuator by fixing a predefined desired value of the stroke of the displacement member or plunger of the volume-receiving unit. The control valve housing which is movably arranged in relation to a stationary part in the same way as the slide-type control member of the three-way/three-position directional control valve is in driving engagement either with a desired-value adjuster or with the displacement member or plunger. The control member is also drivingly engaged either with the displacement member or plunger or with the desired-value adjuster in such a fashion that, in the event of readjustment of the control valve as caused by the stroke of the desired-value adjuster due to a change in the adjusting force of the actuator, the displacement member or plunger is urged in a direction in which the movement of the part of the control valve which is coupled with the displacement member or plunger will follow the movement of the part of the control valve coupled to the desired-value adjuster in the same sense or direction relative to the stationary part.

On slippery grounds, a wheel may tend to lock under certain circumstances even if the vehicle brake is actuated with relatively small forces. In such case, a comparatively low pressure will be attained in the working chamber as well as in the wheel brake cylinder connected thereto prior to the modulator's response. In such an event, the modulator must decrease a comparatively low initial pressure in the working chamber or in the wheel brake cylinder in order to allow a locking wheel rotate again. To enable the modulator to respond as fast as possible in such situation, it may be expedient to constantly adapt the adjusting force generated by the actuator when the modulator is not operated to the pressure in the brake system. That is, such that the adjusting force is only slightly greater than the force required to retain the displacement member of plunger shifted to its in end position in opposition to the respective pressure in the brake system.

According to an important embodiment of the invention the control member of the control valve functions as a pressure governor by being provided with effective surfaces that may be exposed to the wheel-brake cylinder pressure as well as by the pressure or vacuum in the actuator. The control member functions by means of the pressure forces applied to the effective surfaces in such a sense that the pressure differential acting upon the piston and diaphragm assembly of the actuator will rise or fall with the wheel cylinder pressure - at least when the modulator is not operated.

According to another feature, an adapter valve is provided between the vacuum or pressure source and the port of the control valve leading thereto. The adapter valve is controllable in dependence upon the pressure in the master brake cylinder or wheel brake cylinder and closes or throttles the connection between the vacuum or pressure source and the port of the control valve and opens a connection of this port to the atmosphere in a controllable throttling manner. Thus, the pressure or vacuum prevailing at the port is adapted to the pressure in the brake system.

It is preferable in any case that the actuator generate a minimum adjusting force when the brake is not applied in order to constantly move the displacement member or plunger of the volume-receiving unit in the direction of its in position, that is when it is shifted into its associated working chamber, even in the presence of infinitely low pressure in the brake system.

An important embodiment of this invention resides in that the volume-receiving unit, rather than the master cylinder coupled to separating valves, is allocated to the wheel brake cylinders.

To achieve this object, it is preferable that the piston of the volume-receiving unit which is biased by a resetting spring into its inactive position is, in opposition to the effect of the resetting spring, acted upon by the end of an outlet lever arm of a roll-on curve lever gear that is disposed remote from its joint. A control force is generated on the lever arm by an electric motor and acts in one or the other tilting direction. Further, a predetermined inlet force acts in the direction of the gear roll upon the inlet arm of the roll-on curve lever gear at the end remote from the arm's joint.

That is to say, inventively, it is the first time that a roll-on curve lever gear has been used to apply a volume-receiving unit which is directly acting upon a wheel brake circuit.

A preferred embodiment of this invention is characterized in that the Bowden cable of a hand brake engages the joint-remote end of the outlet lever arm of the roll-on curve lever gear in the direction of compressing the resetting spring.

To this effect, the Bowden cable is mounted on the extreme end of the outlet lever arm in such a fashion that, in the event of electrical actuation, the outlet lever arm is able to freely move when the Bowden cable is at a standstill. Accordingly, a hand brake actuation of the volume-receiving unit acting as a master cylinder, is possible in addition to actuation by the outlet lever arm of the roll-on curve lever gear.

A particularly simple electric control of the roll-on curve lever gear is enabled in that the outlet lever arm is designed as a bell crank lever, and in that the angular part projecting from the joint is applied by the electric motor by way of a gear with a torque around the joint. The electric motor which preferably is designed as a stepping motor, is able to tilt the bell crank lever into the one or the other direction with very little force, in consequence whereof the transmission ratio is changed in the desired manner and the piston of the volume-receiving unit is applied with more or less force.

According to another embodiment, the angular part is designed as a toothed-wheel segment at its end remote from the joint, into which segment a pinion driven by the electric motor is engaged.

Preferably, each brake circuit comprises a braking pressure modulator of its own which is equipped with a volume-receiving unit, a roll-on curve lever gear, a gear unit and an electric motor. More particularly, it is preferable if each front-wheel brake cylinder is provided with a braking pressure modulator of its own, while one joint braking pressure modulator is provided for both rear-wheel brake cylinders.

Preferably, all braking pressure modulators are controlled by an electronic brake control device to which the brake pedal and the brake slip sensors are connected.

The roll-on curve lever gear according to the invention is described in detail in German published patent application No. P 37 18 944.

BRIEF DESCRIPTION OF THE DRAWING

The invention will be better understood from the following Detailed Description of a Preferred Embodiment with reference to the accompanying drawings. In the drawings:

FIG. 3 shows an alternative embodiment of another embodiment of a modulator in accordance with this invention;

FIG. 4 is a graph showing the pressure decline in the volume-receiving unit when the plunger shifts in its out direction and when varying initial pressures are prevailing during closing of the separating valve. FIG. 4 further illustrates the pressure in the volume-receiving unit that is in balance with differing constant adjusting forces of the actuator;

FIG. 5 is a chart-type illustration of the modulator's function;

DETAILED DESCRIPTION OF A PREFERRED EMBODIMENT

Figure 1:
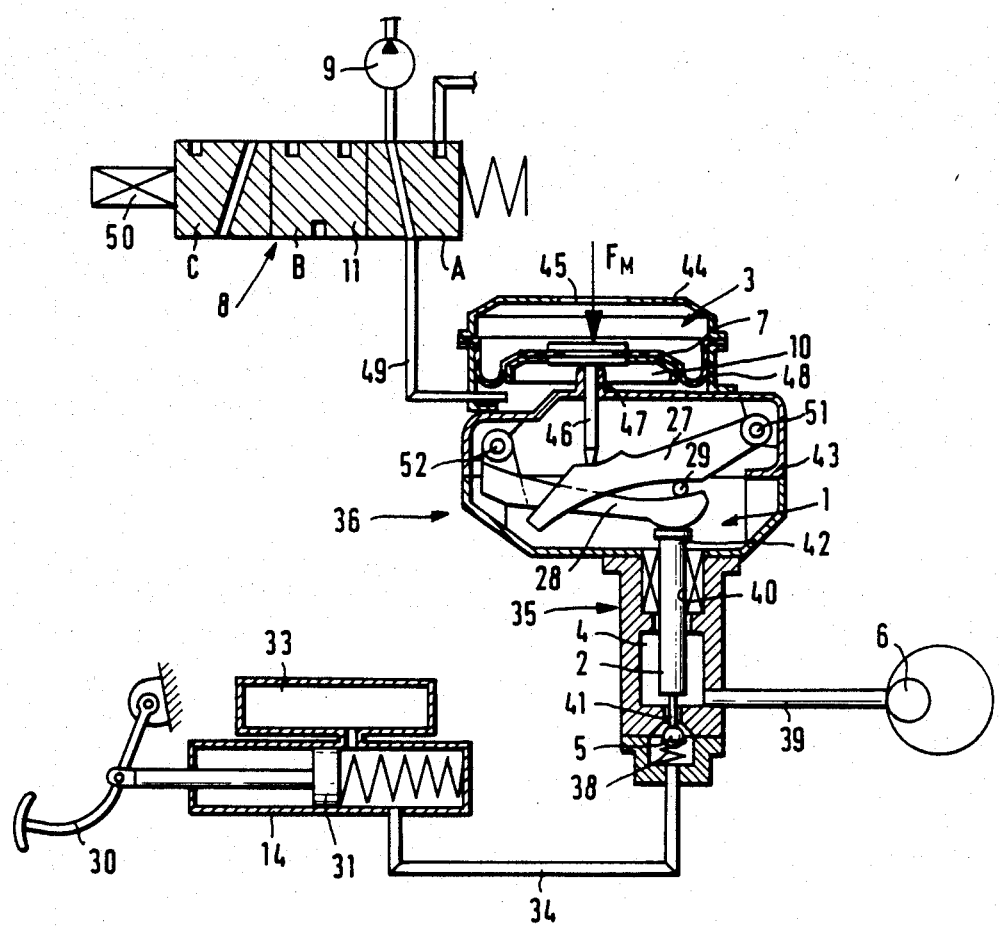
FIG. 1 is a schematically illustrated brake system incorporating a braking pressure modulator according to the invention.

In the brake system illustrated in FIG. 1, a brake pedal 30 acts upon the piston 31 of the master brake cylinder 32 which is supplied with hydraulic fluid by a supply reservoir 33. A hydraulic line 34 leads from the pressure chamber of the master brake cylinder 32 to the volume-receiving unit 35 of the braking pressure modulator designated generally by reference numeral 36. The volume-receiving unit 35 accommodates a cylinder chamber 4 which, on the one hand, communicates with the hydraulic line 34 by way of the separating valve 5, which is designed as a spherical valve acted upon by a spring 38, and with the wheel brake cylinder 6, shown schematically, by way of a further hydraulic line 39. The line 39 could also lead to two or more wheel brake cylinders.

Incorporated in cylinder chamber 4 is the circular cylinder-shaped plunger 2 which extends sealedly outwardly through a guide bore 40 that is axially opposite to the separating valve. In the illustrated end position in which it is shifted into the cylinder chamber 4 of the volume-receiving unit 35, the end surface of the plunger 2 facing the separating valve 5 abuts on an actuating tappet 41 and keeps the separating valve 5 open in opposite to the force of the spring 38. The plunger 2 extends outside of the volume-receiving unit 35 by means of a tappet 42 which serves to couple the plunger 2 with the actuator 3 through the lever gear unit 1.

The actuator 3 includes a cross-sectionally circular housing 44 which is placed on the gear housing 43 and which is sealedly closed by the gear housing on its bottom side in FIG. 1 and which contains an opening 45 for the entry of atmospheric air on its upper side as viewed in FIG. 1. Located inside the housing 44 is the piston 7 which, by means of its piston rod 46, is slidingly displaceably guided in the guide bore 47 arranged at the gear housing 43, with its axis being parallel to the axis of the plunger 2. The gap between the piston rod 46 and the guide bore 47 is closed by non-illustrated seals. A diaphragm or bellows assembly 48 is arranged between the piston 7 and the wall of the housing 44 enclosing the piston. The piston 7 confines within the housing 44 the chamber 10 which is connected with the control valve assembly 8 by the pneumatic line 49 which in turn connects the chamber 10 in the valve's position A with the vacuum source 9 and connects it in the position C with the atmosphere or, respectively, closes it in the position B.

In the illustrated embodiment of FIG. 1, the control valve assembly 8 is operated by means of the electromagnet 50 which is actuated by a brake slip control apparatus not shown. Depending on the actuation of the control valve assembly 8, the pneumatic pressure in the chamber 10 can be approximated or adapted to the pressure of the atmosphere or the vacuum of the vacuum source 9, respectively. Accordingly, either a pressure corresponding to the pressure of the atmosphere or a more or less great vacuum exists in the chamber 10. Since the piston 7 and the diaphragm or bellows assembly 48 is constantly acted upon by the atmosphere on its side remote from the chamber 10, and, in general, a lower pressure, as compared to the pressure of the atmosphere, exists in the chamber 10, the piston 7 is urged downwardly, as viewed in the drawing, with changing force. The magnitude of this force depends on the difference between the pressure of the atmosphere on the side of the piston 7 close to the opening 45 and the vacuum in the chamber 10. The adjusting force $F_M$ of the piston generated in this way is then transmitted by the gear unit 1 onto the tappet 42 or the plunger 2 so that the plunger 2 is urged into the cylinder chamber 37 of the volume-receiving unit 35.

In principle, the operation of the braking pressure modulator 36 of FIG. 1 is as follows:

On normal braking actions in the absence of brake slip, the plunger 2 of the volume-receiving unit 35 will assume an in end position as shown in FIG. 1, in which position the separating valve 5 is kept on by the actuating tappet 41 abutting on the plunger 2. In order to retain the plunger 2 in this position, a sufficient vacuum is maintained in the chamber 10 of the actuator 3 by the control valve assembly 8 staying in its position A so that the chamber 10 is in permanent communication with the vacuum source 9.

In case the pressure in the cylinder chamber 4 as well as in the wheel brake cylinder 6 connected thereto rises due to a correspondingly strong depression of the brake pedal 30 in such a fashion that the wheel is locking, the control valve assembly 8 will be operated by the brake slip control apparatus in such manner that the vacuum in the chamber 10 is approximated to the pressure of the atmosphere and the adjusting for $F_M$ of the piston 7 decreases corresponding. This allows the pressure forces acting on the plunger 2 in the cylinder chamber 4 to shift the plunger 2 out of the cylinder chamber 37 so that the separating valve 5 is closed by its spring 38. As the adjusting force $F_M$ of the piston 7 continued to be correspondingly controlled, i.e., decreased, by corresponding control of the control valve assembly 8, the plunger 2 will continue to shift out, with the separating valve 5 closed. As a result, the pressure in the cylinder chamber 37 as well as in the wheel brake cylinder 6 declines—e.g., exponentially—and the actuating force of the wheel brake cylinder 6 is increasingly reduced until the previously locked wheel starts to rotate again.

Subsequently, the plunger 2 can be slide back gain in the direction of the illustrated inactive position by an increase in the adjusting force $F_M$ of the piston 7 in order to reincrease the pressure in the cylinder chamber 37 as well as at the wheel brake cylinder 6 and/or to reconnect the cylinder chamber 37 with the master brake cylinder 14 by opening the separating valve. Should the wheel again lock, action will be repeated.

The gear unit 1 interposed between the tappet 42 of the plunger 2 and the piston rod 46 of the piston 7 has a transmission characteristic which changes in dependence on the gear unit's position in such a fashion that a balance is maintained irrespective of the position of the gear elements when the piston rod 46 is stressed in the downward direction, as viewed in the drawing, by a constant force and the tappet 42 is stressed in the upward direction by a force exponentially varying during the stroke of the tappet 42.

Figure 2:
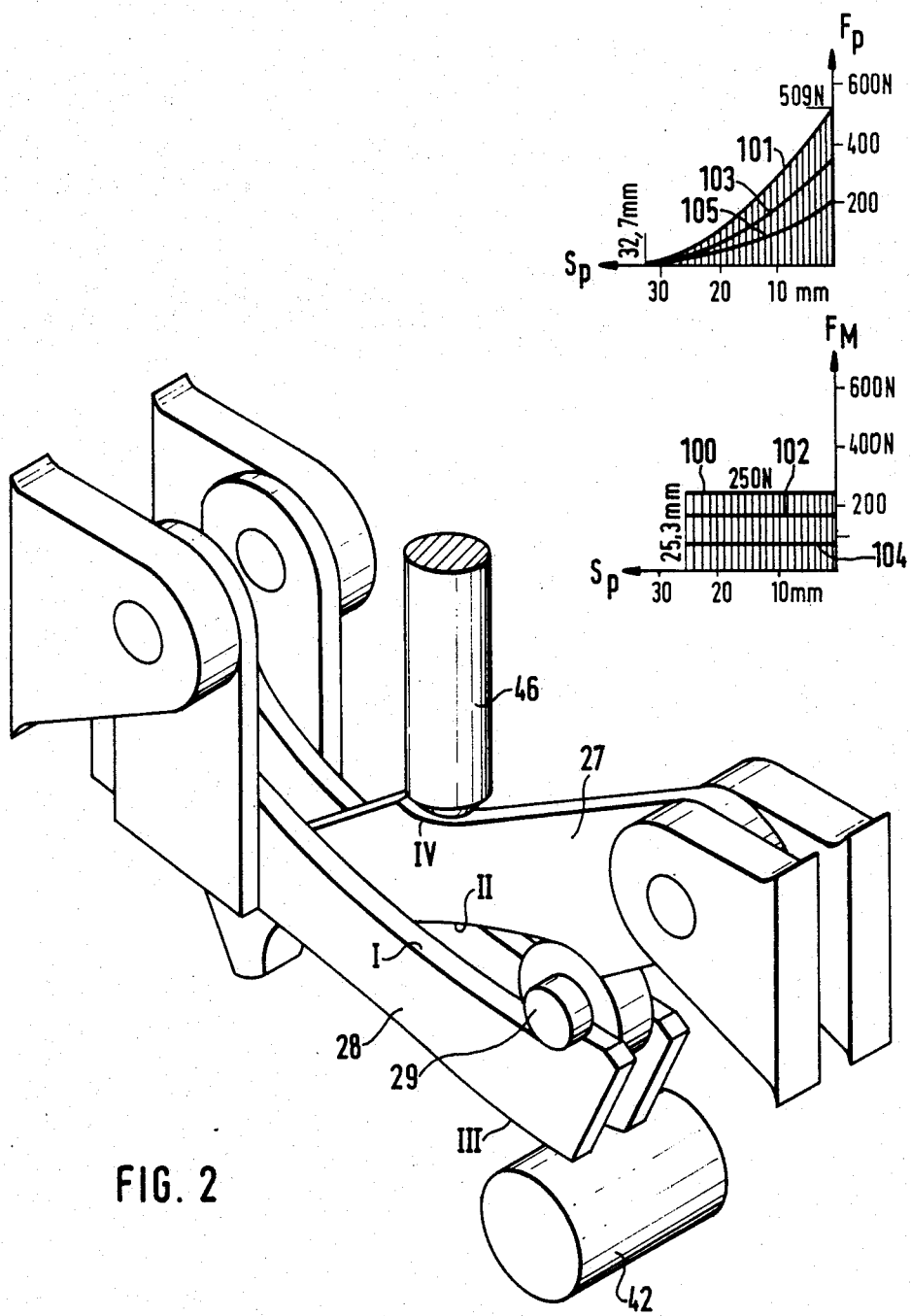
FIG. 2 is a perspective view of the lever gear unit arranged between the vacuum actuator and the volume-receiving unit of the braking pressure modulator illustrated in FIG. 1 and includes force diagrams of the operation thereof.

These characteristic features of the gear unit are attained by the construction of the gear unit 1 according to FIG. 1 as more precisely shown in the perspective view of FIG. 2.

In the gear housing 43 or in a frame mounted in lieu thereof, levers 27 and 28 having tilting axes 51 and 52 in parallel to each other are rotatably supported at opposed housing or frame parts. The free ends of the levers 27 and 28 each extend roughly in the direction of the tilting axis 51 or 52 of the respective other lever. Lever 28 is composed of two congruent and—in relation to each other—nonrotatable parts which are interconnected in fork-like fashion, for instance by means of the axis 52 supporting the lever 28. In this arrangement, the distance between the congruent parts of the lever 28 is dimensioned such that the lever 27 is permitted to swivel in between these parts or the congruent parts of the lever 28 are allowed to swivel sideways past the lever 27.

Roll-on curves I and II are disposed on opposed lever flanks on the levers 27 and 28. Each of the roll-on curves I and II is concavely cured on the side facing the respectively other roll-on curve.

Rolling on the roll-on curves I and II is a roller element 29 which is composed of coaxially arranged rolls of small and large diameter. The roll of small diameter rolls on roll-on curve I at the lever parts of lever 28 and the roll of large diameter rolls on the roll-on curve II on lever 27. These rolls of large and small diameter are able to twist in relation to one another.

Disposed on the flanks of the levers 27 and 28 remote from the roller element 29 are two additional outward roll-on curves III and IV which are acted upon by the tappet 42 of the plunger 2 or the piston rod 46 of the actuator 3, respectively.

When the levers 27 and 28 tilt upon displacement of the tappet 42 and the piston rod 46, the position of the points of contact of the tappet 42 and the piston rod 46 on the outward roll-on curves III and IV will change. Simultaneously, the roller element 29 moves automatically on the inward roll-on curves I and II. On account of the concave shape of the roll-on curves I and II, the roller element 29 is allowed to assume in each case only one sinlge stable position between the levers 27 and 28. The position changes with the position of the levers 27 and 28, when the levers 27 and 28 are urged against the roller element 29 by the piston rod 46 and the tappet 42. Accordingly, upon readjustment of the gear unit 1, the roller element 29 will automatically wander to assume the stable position assigned to the respective position of the levers 27 and 28.

As a result of the change in position of the roller element 29 during readjustment of the gear unit 1, the transmission of the gear unit will change in dependence upon the respective position of the levers 27 and 28. In addition to this, the change of transmission is also influenced by the position of the points of contact between the roll-on curves III and IV and the piston rod 46 or the tappet 42 with the said position varying with the lever movements.

Instead of the tilting axes 51 and 52, if so desired, knife-edge bearings may also serve to support the levers 27 and 28 in FIGS. 1 and 2. Provided that the roller element 29 in FIG. 1 assumes a position that is on the left of the axis of the plunger 2 or the tappet 42 in all positions of the gear unit 1, downwardly directed knife edges can be arranged at the lever 28 in FIG. 1 (e.g., in the area of the tilting axis 52), which knife edges grip into notches in the housing or the like. Instead, however, it is also possible to provide on the housing upwardly directed knife edges and on the lever downwardly opened notches or the like.

If desired, lever 27 also can be supported by way of knife edges when the roller element 29 remains on the right side of the axis of the piston rod 46 in all positions of the gear unit 1 in FIG. 1. In this event, upwardly directed knife edges can be arranged on the lever 27 instead of the tilting axis 51. The knife edges would engage into downwardly opened notches on the housing or the like. Instead, it is again possible to provide for downwardly directed knife edges on the housing and upwardly opened notches at the lever 27.

The braking pressure modulator 36 shown in FIG. 3 differs from the construction shown in FIG. 1 first in that the lever 28 is designed as a double-armed bell crank lever. The one lever arm cooperates with the roller element 29, while the other lever arm coacts with the tappet 42 of the plunger 2 of the volume-receiving unit 35 which is in this case located at the side of the gear housing 43.

In the embodiment shown in FIG. 3, the actuator 3 is integrated into the gear housing 43 such that the piston 7 or the diaphragm and bellows assembly 48 shut of the chamber 10 located at the bottom of the gear housing 43 in a direction toward the upper side of the housing.

In a manner similar to the embodiment illustrated in FIG. 1, the chamber 10 is connectable with the atmosphere or with a vacuum source and/or is closable in relation to the atmosphere as well as to the vacuum source by the control valve assembly 8, not shown in FIG. 3. Accordingly, a vacuum can be produced in a controlled manner in the chamber 10, which is in contrast to the rest of the gear housing 43 that is open to the atmosphere through non-illustrated openings.

On the upper side of the piston 7 on either side of the levers 27 and 28, there are arranged pull rods 53 which, at their upper ends, are coupled with a tappet 55 that is slidingly displaceably guided in the guide bore 47 of the gear housing 43 and cooperates with the outward roll-on curve IV on the lever 27. That is to say, in the presence of vacuum in the chamber 10, the piston 7 is stressed downwardly in FIG. 3 on account of the differential pressure existing between its lower and upper side, with the tappet 55 being drawn by the pull rods 53 against the lever 27.

Since the pull rods 53 are coupled with the bottom end of the tappet 55 in FIG. 3, the mid-portion of the tappet 55 between the tappet parts cooperating with the lever 27 or the guide bore 47 is substantially not subjected to bending or buckling load. In contrast to the piston rod 46 in FIG. 1, the tappet 55 in FIG. 3 may, therefore, be dimensioned relatively smaller. In addition the guide bore 47 in the embodiment of FIG. 3 is loaded considerably less and the parts of the gear housing 43 containing this guide bore 47 may be dimensioned considerably smaller.

Another advantage of the embodiment according to FIG. 3 is that the actuator 3 is integrated to fit advantageously into the gear housing 43.

The advantage of the embodiment of FIG. 1 is principally due to the friction at the tilting axes 51 and 52 being less. This can be seen from the vector diagrams in FIGS. 1 and 3. Therein $F^p$ is in each case the force exerted by the plunger 2 on the lever 28, $F_k$ is the force exerted by the roller element on the lever 27 or 28, $F_{51}$ is the force acting on the tilting axis 51 and $F_{52}$ is the force acting on the tilting axis 52.

In all embodiments of the braking pressure modulator 3 or the gear unit 1 illustrated in FIGS. 1 to 3, the roll-on curves I, II, III and IV are dimensioned such that, in all positions of the levers 27 and 28 of gear unit 1 occurring during operation, a constant force $F_M$ by which the piston rod 46 (in FIG. 1) or the tappet 55 (in FIG. 3) acts upon the lever 27 in the downward direction, is kept in balance with a force $F_p$ which exponentially declines as the plunger 2 moves further away from its position in the volume-receiving unit 35. The plunger 2 presses the tappet 42 against the lever 28 with which force $F_p$.

This is illustrated in the force diagrams in FIG. 2.

The bottom diagram in FIG. 2 shows the force $F_M$ in dependence on the plunger stroke, while the upper diagram in FIG. 2 shows the force $F_p$ exponentially declining with the plunger stroke $S_p$. When the force $F_M$ remains constant corresponding to the curve 100 and the force $F_p$ declines exponentially corresponding to the curve 101, the lever gear unit is maintained in indifferent balance. The same applies when the force $F_M$ remains constant on lower values corresponding to the curves 102 or 104 and the force $F_p$ varies corresponding to the curves 103 and 105.

The curves 101, 103 and 105 run together like beams; this "beam characteristics" is based on the fact that, with the gear unit 1 stationary, and the forces $F_p$ or $F_M$ changing, a condition of balance can be present only if the ratio $F_M/F_p$ is kept constant when the forces $F_M$ and $F_p$ vary.

FIG. 4 shows how the pressure p acting upon the plunger 2 in the volume-receiving unit 35 decreases in dependence upon the relative plunger stroke $s/s_{max}$ (wherein s designates the actual plunger stroke and $s_{max}$ refers to the maximum possible plunger stroke). The curve 110 shows the change of the pressure p for the case where the plunger 2, after attainment of an initial pressure of 30 bar in the volume-receiving unit 35, is shifted out of its in-shifted end position when the separating valve 5 is closed. The curves 111 to 113 show the conditions where the plunger is shifted out only at increased initial pressures of 75, 120 or 140 bar, with the separating valve 5 being closed.

The exponential drop of the pressure p in dependence upon the relative plunger stroke $s/s_{max}$ represented by the curves 110, 111, 112 and 113 is based on the volume elasticity of the hydraulic medium enclosed in the volume-receiving unit 35, the wheel brake cylinder 6 and in the line 39, as well as on the elasticity of the walls of volume-receiving unit 35, wheel brake cylinder 6 and line 39.

The curves 110, 111, 112 and 113 emanate from one another by parallel displacement so that curves corresponding to the curves 110, 111, 112 and 113 can be easily constructed for intermediate values of the initial values of p indicated in FIG. 4.

In the embodiment of FIG. 4, at most, an initial pressure of 120 bar can be decreased to an infinitely low pressure by a full plunger stroke. In the presence of a higher initial pressure of, e.g. 140 bar, a residual pressure of, e.g. 3.1 bar, see curve 113, will remain in the volume-receiving unit 35 as well as in the wheel brake cylinder 6 and the line 39 even after the maximum possible plunger stroke has been performed. If the initial pressure is less than 120 bar, an infinitely low pressure will already be attained in the event of a partial stroke of the plunger 2, compare curves 110 and 111.

It shall now be assumed that an initial pressure of 140 bar is the maximum pressure which is admitted in the volume-receiving unit 35.

The gear unit 1 is dimensioned in respect of its roll-on curves I, II, III and IV such that those forces exerted by the piston rod 46 or the tappet 55 onto the lever 27 and those forces applied by the plunger 2 or the tappet 42 on the lever 28 of the gear unit 1 constantly remain in balance when the plunger 2 is moved in its shifted-out direction after attainment of the maximum possible initial pressure of 140 bar and with the separating valve closing. The piston rod 46 or the tappet 55 consistently applies to the lever 27 with that force which occurs when the difference in pressure between the pressure on the upper side of the piston and the pressure on the lower side of the piston 7 or in the chamber 10 reaches a constructively defined differential pressure predetermined by the capacity of the vacuum source 9. This is equivalent to the fact that the ratio $\Delta p_v/\Delta p_{av}$ between the actually existing differential presssure $\Delta p_v$ and the constructively defined differential pressure $\Delta p_{av}$ has the value 1.

Curve 113 has a double meaning on account of the described construction of the braking pressure modulator. First of all, curve 113 shows as has been explained hereinabove, how the pressure in the volume-receiving unit 35 declines from the initial pressure of 140 bar when the plunger 2 shifts out of the volume-receiving unit 35 (after the separating valve 5 has closed) in dependence upon the plunger stroke. In addition thereto, curve 113 also shows what pressure must be present in the volume-receiving unit 35 in dependence upon the position of plunger 2 in order to keep the gear unit 1 in an indifferent balance state, when the piston 7 of the actuator 3 is constantly—that is irrespective of the position of the plunger 2—loaded by the constructively defined differential pressure, that is when the ratio $\Delta p_v/\Delta p_{av}=1$.

The curves 114, 115, 116 and 117 in FIG. 4 show those pressures p which must exist in the volume-receiving unit 35 in order to keep the gear unit 1 in the indifferent balance state when the piston 7 of the actuator 3 is acted upon by a differential pressure below the constructively defined differential pressure, that is, when the rate $\Delta p_v/\Delta p_{av}$ has assumed the value 0.8 in the case of curve 114, the value 0.6 in the case of curve 115, the value 0.4 in the case of curve 116 and the value 0.2 in the case of curve 117. The curves 113, 114, 115, 116 and 117 have the same beam characteristics as the curves 101, 103 and 105 in FIG. 2.

Due to the described constructively defined characteristic of the braking pressure modulator 3 or the gear unit 1 and the beam characteristic of the curves 113, 114, 115, 116 and 117 as well as the parallelism of the curves 110, 111, 112 and 113, the gear unit 1 may run through consecutive conditions of balance, with the ratio $\Delta p_v/\Delta p_{av}$ remaining constant, only if this ratio has the value 1 and the plunger 2 is moved in the shift-out direction only after attainment of an initial pressure of 140 bar in the volume-receiving unit 35, with the separating valve 5 closing. In this instance, the plunger 2 can be moved by minimum outside forces which only need be sufficient to overcome the friction within the braking pressure modulator 36 and, in particular, within the gear unit 1. These forces can be generated for instance in that, by way of corresponding actuation of the control valve assembly 8, the ratio $\Delta p_v/\Delta p_{av}$ is decreased slightly below the value 1 or is raised in excess of 1 in order to accomplish movement of the plunger 2 in the shift-out direction or in the shift-in direction, respectively.

The braking pressure modulator can be operated in such manner that, with the vehicle driving and the vehicle brake not applied, a large differential pressure corresponding to $\Delta p_v/\Delta p_{av}=1$ is always acting on the piston 7 of the actuator. Thereby, the plunger 2 is always kept in its end position in which it is shifted into the volume-receiving unit 35.

When the pressure p in the volume-receiving unit 35 is increased by increased depression of the brake pedal 30 to a value of 140 bar, the plunger 2 is forced to move in the shift-out direction upon each further pressure rise, with the separating valve 5 closing. This limits the pressure in the volume-receiving unit 35 in any case to a value of 140 bar, with a ratio $\Delta p_v/\Delta p_{av}=1$. That is the separating valve 5 as well as the plunger 2 which actuates the valve by way of the tappet 41 act as pressure limiters for the wheel brake cylinder 6 connected to the volume-receiving unit 35.

Should the braked wheel lock on account of the high initial pressure of 140 bar attained in the volume-receiving unit 35 as well as in the brake cylinder 6 connected thereto, the plunger 2 can be moved in the shift-out direction by very minor outside force, in order to relieve the pressure in the brake cylinder of the locking wheel. In case of need, this minor outside force can be generated by actuating the control valve assembly 8 in order to decrease the ratio $\Delta p_v/\Delta p_{av}$ slightly below the value 1. To this end, some outside air can be introduced into the chamber 10.

Should the braked wheel lock in the presence of a lower pressure of, e.g. 75 bar in the volume-receiving unit 35, the plunger 2 must be applied by a greater outside force in order to cause a movement in the shift-out direction, if the value of the ratio $\Delta p_v/\Delta p_{av}$ is maintained constantly at the value 1.

Alternatively, it is also possible to reduce the difference in pressure existing between upper side and lower side at the piston 7 of actuator 3 by introducing outside air into the chamber 10 in such a manner that the ratio $\Delta p_v/\Delta p_{av}$ is greatly decreased in relation to the value 1.

This is illustrated in the chart of FIG. 5.

Prior to commencement of braking, a pressure of 0 bar is prevails in the plunger working chamber. The ratio between the actual difference $\Delta p_v$ of the pressure on the upper side and lower side of the piston 7 as well as the constructively defined differential pressure $\Delta p_{av}$ equals 1. The plunger is in its in-shifted end position, that is the ratio between the stroke s actually performed by the plunger and the maximum possible stroke $s_{max}$ is 0. As a result of a brake application, the hydraulic pressure in the plunger working chamber 4 will rise to 75 bar. Since the adjusting force of the actuator 3 remains unchanged at first, the ratio $\Delta p_v/\Delta p_{av}=1$ continues to apply. Accordingly, the plunger remains in the in-shifted end position, that is $s/s_{max}=0$. In response to the locking wheel, a brake slip control apparatus initiates a first control step which causes actuation of the control valve assembly 8 in such a way that the differential pressure acting upon the piston 8 is reduced by introducing outside air into the chamber 8 until $\Delta p_v/\Delta p_{av}=0.54$. Although the plunger 2 is still retained in its in-shifted end position, the condition of the braking pressure modulator has changed inasfar as now the forces which are transmitted by the plunger 2 onto the gear unit 1 as well as the forces transmitted by the actuator 3 onto the gear unit 1 are in a condition of balance when the plunger 2 has assumed its in-shifted end position.

Now further control steps are performed by means of which the introduction of further outside air into the chamber 10 causes the ratio $\Delta p_v/\Delta p_{av}$ to consecutively decrease to the values 0.40 and 0.20 as well as 0. By these control steps, new positions of balance are predefined which correspond to the respective points of intersection of curve 111 with curves 116 and 117, the abscissa in FIG. 4. As a result, the plunger moves according to curve 111 in FIG. 4, that is the relative plunger stroke s/s$_{max}$ passes through and attains successively the values 0.24 and 0.47 and 0.72, respectively. Simultaneously, the hydraulic pressure in the plunger working chamber 4 declines to the values 40 bar and 12.5 bar and 0 bar, respectively.

Figure 6:
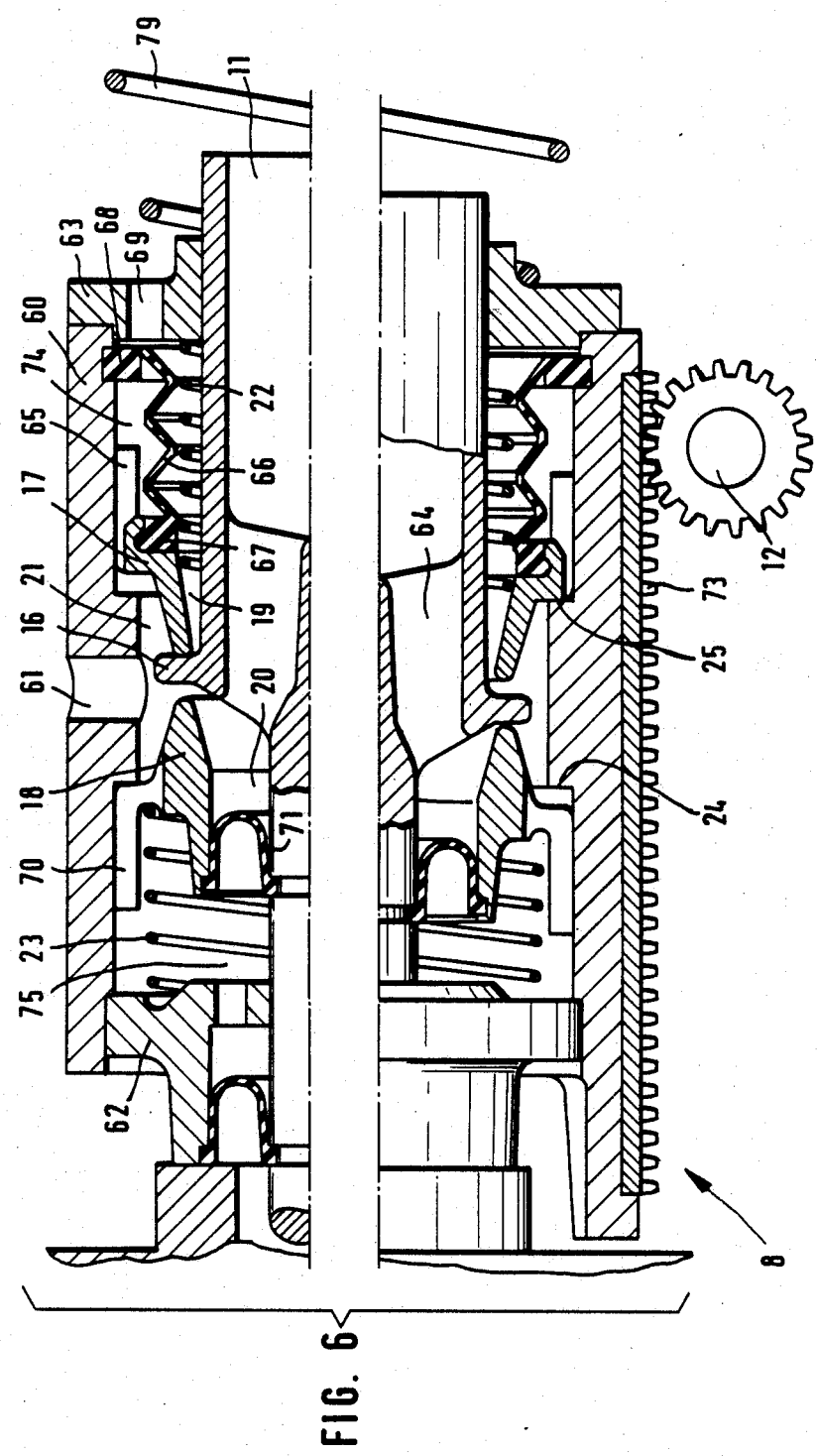
FIG. 6 is a cross-sectional view of a control valve for varying the adjusting force of the actuator showing details of construction.
Figure 7:
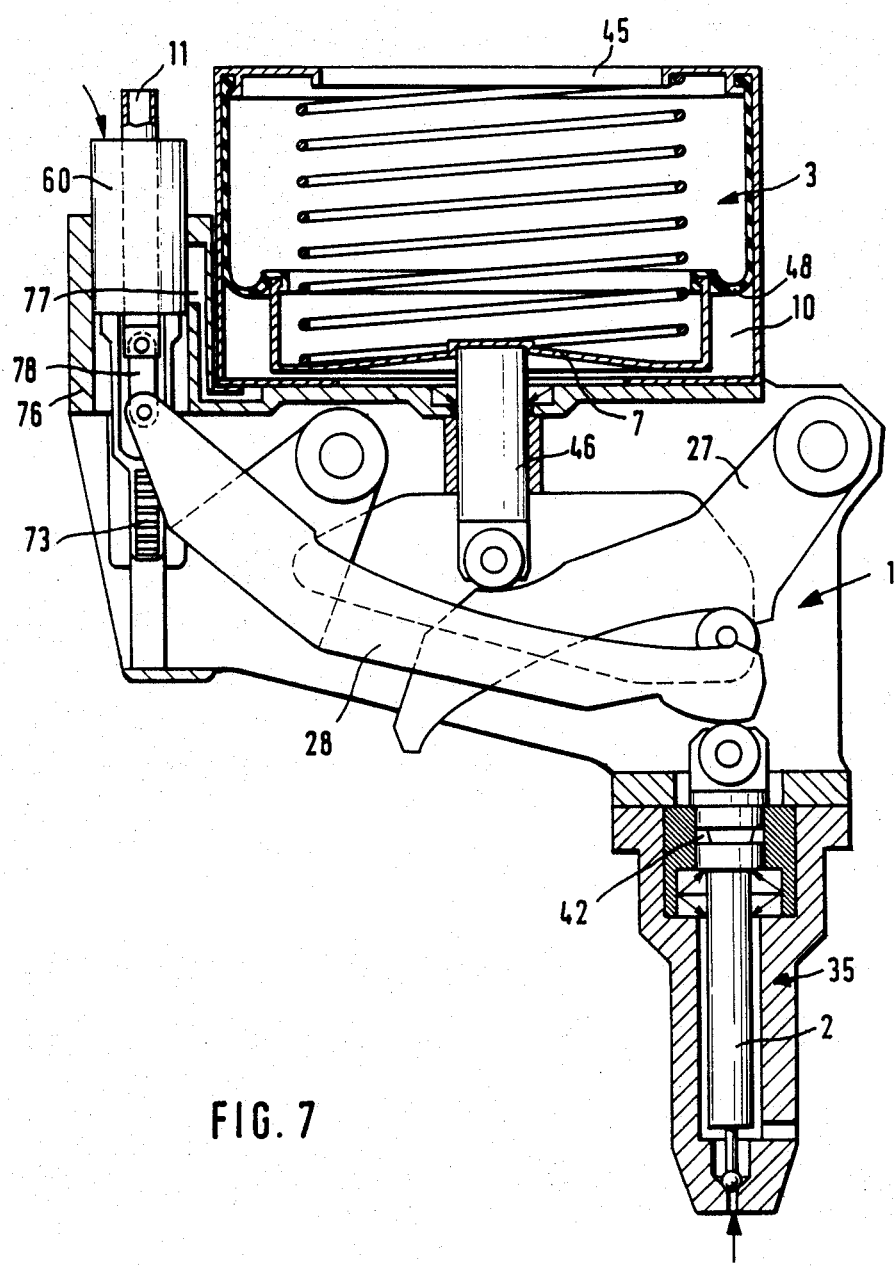
FIG. 7 is a partial cross sectional view showing the control valve shown in FIG. 6 assembled into the modulator according to the invention.

A first embodiment of the control valve assembly 8 as well as integration thereof into the braking pressure modulator 35 are illustrated in more detail by way of the FIGS. 6 and 7.

A substantially hollow-cylindrical housing 60 contains a radial opening 61 interconnecting the inside and outside and is located roughly in the middle of the housing's frontal ends. On either side of the radial opening 61, the inside diameter of the housing 60 is provided with of two annular steps 24 and 25. Placed in the bottoms 62 and 63 disposed at the housing's frontal ends are guide openings for sliding displaceable support of the slide 11 which is of circular configuration in cross-section and projects with its two ends from the housing 60. The slide 11 is illustrated in FIG. 6 in two different relative positions to the housing 60 and is composed of a rod-shaped part of small diameter arranged on the left in FIG. 6 and a tubular part of larger diameter to the right, with the rod-shaped part projecting with a projectile-like tapered tip into the tubular part and being coupled there with the tubular part by means of star-like arranged webs. That is to say, axial openings 64 are left between the webs which establish communication between the interior of the tubular part and the surroundings of the adjacent rod-shaped part. Placed at the left frontal edge of the tubular part of the slide 11 is a radial collar 16 whose outer periphery is radially spaced from the wall of the housing 60 between the annular steps 24 and 25.

The collar 16 forms a double-sided valve seat and its two frontal ends cooperate with annular valve members 17 and 18 which encompass the tubular part or the rod-shaped part of the slide 11 and are located axially slidably in the housing 60 and which, by means of spring 22 or 23, are clamped against the annular steps 24 and 25 coacting as stops with the valve members 17 and 18.

The valve member 17 has a funnel-shaped mouthpiece facing the collar 16, whose outside diameter is everywhere smaller than the inside diameter of the housing portion between the annular steps 24 and 25. The smaller-diameter frontal end of the mouthpiece close to the collar 16 is of a diameter less than the outside diameter of the collar 16 so that the beadedly rounded frontal edge of the mouthpiece of the valve member 17, which on the left side in FIG. 6, is allowed to take a sealing seat on collar 16 when the slide 11 is correspondingly positioned. Neighboring on the right side of the mouthpiece of valve member 17 is an annular collar which ha a diameter enlarged in relation to the inside diameter of the housing 60 between the annular steps 24 and 25 and which carries sliding members 65 spaced from one another in the circumferential direction and which serve to slidingly displaceably guide the valve member 17 on the inner wall of the housing 60. The mouthpiece of the valve member 17 has such axial dimensions that both the annular collar and the sliding members 65 of the valve member 17 remain at an axial distance from the annular step 24 when the slide 11 with the collar 16 is placed approximately in the middle of the radial opening 61 with the mouthpiece of the valve member 17 abutted on the facing frontal end of the collar 16.

The spring 22 of the valve member 17 serves as a supporting member for a bellows 66 which is sealedly connected with annular seal parts 67 and 68 which are inserted into internal, annular-groove-shaped recesses on the valve member 17 as well as on the housing 60 as shown in FIG. 6 and which also perform the function of supports for the spring 22 on the housing or on the valve member, respectively. Between the tubular part of the slide 11 and the valve member 17 as well as the bellows 66 is the annular chamber 19 which is opened to the outside through an axial opening in the left bottom 63.

The valve member 18 has a substantially cylindrical mouthpiece whose outside diameter, in turn, is less than the inside diameter of the housing 60 between the annular steps 24 and 25. The wall thickness of the mouthpiece tapers toward the collar 16 in a fashion such that the inside diameter enlarges toward the collar 16 while the outside diameter is reduced. The frontal edge facing the collar 16 is also bead-like rounded and is adapted to sealingly sit on the facing frontal end when the collar 16 is corresponding positioned.

Arranged at the outer periphery of the valve member 18 are sliding members 70 which are spaced from one another in the circumferential direction and which slidingly displaceably guide the valve member 18 on the inside wall of the housing 60 adjacent to the annular steps 24 on the left in FIG. 6. In far beyond the sliding members 70 in the direction of the collar 16 that a clearance remains between these sliding members and the annular step 24 when the mouthpiece of the valve member 18 takes seat on the facing frontal end of the collar 16 and the collar 16 assumes a mid-position in relation to the radial opening 61.

The annular chamber 20 between the rod-shaped part of the slide 11 and the valve member 18, which chamber succeeds the openings 64 of slide 11, is sealed by an annular rolling diaphragm 71 at the end of the valve member 18, that is on the left in FIG. 6, and is formed by a sleeve-shaped axial extension. The rolling diaphragm is arranged between the inside wall of the valve member 18 and the outside wall of the rod-shaped part of slide 11 and the bead-shaped edges are sealingly inserted into annular grooves on the valve member 18 s well as on the slide 11. Viewed in the axial cross-section of FIG. 6, the rolling diaphragm 71 has a U-shaped profile with a U-shaped opening facing the bottom 62. In the event of relative movements between the slide 11 and the valve member 18, the rolling diaphragm 71 will roll on the walls of the valve member 18 as well as of the rod-shaped part of slide 11 facing each other.

On the side remote from the valve member 18 of a part of bottom 62 which contains the guide opening for the rod-shaped of slide 11, there is disposed a similar rolling diaphragm 72 between a sleeve-shaped extension of the bottom 62 and the rod-shaped part of slide 11. The space on the side of the rolling diaphragm 72 close to the valve member 18 is connected with the inner space of the housing 60 through an axial opening in bottom 62.

In principle, the illustrated control valve 8 operates in the following manner:

The annular chamber 19 is in permanent communication with the atmosphere through the axial opening 69. The end of the tubular part of slide 11 projecting from the housing 60 is connected to the suction side of a vacuum source. Connected to the radial opening 61 is the actuator 3, in particular the chamber 10. A driving device allows movement of the housing 60 and the slide 11 in relation to each other.

Initially, the slide 11 with its collar 16 assumes a medium position in respect of the radial opening 61. In this case, the valve members 17 and 18 are seat by their springs 22 and 23 sealingly onto collar 16 in such a fashion that the annular chamber 21 which radially outwardly encloses the valve members 17 and 18 and the collar 16 has no connection to the annular chamber 19 communicating with the atmosphere, or to the annular chamber 20 connected by the tubular part of slide 11 to the vacuum source. Thereby, the chamber 10 of the vacuum actuator 3 connected to the radial opening 16 remains shut off both in relation to the vacuum source and in relation to the atmosphere.

If now slide 11 is displaced relative to the housing 60 sufficiently far toward the valve member 17, the latter is able to retreat in opposition to the force of the spring 22, however, the valve member 17 is permanently kept on its sealing seat on the collar 16 by means of the spring 22. Consequently, the annular chambers 19 and 21 remain closed in relation to one another.

On the other hand, the valve member 18 will lift from the collar 16. This is because, in the above-mentioned direction of movement of slide 11, the valve member 18 is able to move only as far as until it abuts with its sliding members 70 on the annular step 24. When the slide 11 has displaced correspondingly far, a gap disposed between the collar 16 and the valve member 18 and interconnecting the annular chambers 20 and 21 will open so that the chamber 10 of the actuator 3 communicating with the radial opening 61 is connected with the vacuum source connected to the tubular part of slide 11. Accordingly, the valve member 18 as well as the collar 16 form a vacuum valve between the actuator 3 and the vacuum source, which valve opens in the event of the previously described relative movement between the housing 60 and slide 11. The chamber 10 is increasingly evacuated by the vacuum source when the vacuum valve is opened.

When slide 11 in FIG. 6 moves sufficiently far to the left in relation to the housing 60, the valve member 17 which first follows slide 11 and then remains seated on collar 16, will abut with its sliding members 65 or the bead carrying these on the annular step 25 so that the valve member 17 lifts from the collar 16 and a gap is opened which connects the annular chamber 19 with the annular chamber 21. Accordingly, the chamber 10 of the actuator 3, which chamber communicates with the radial opening 61, is connected to the annular chamber 19 and thus with the atmosphere. As a result, the collar 16 and the valve member 17 form an atmosphere valve which opens when the above-described relative movement between slide 11 and housing 60 is performed. When the atmosphere valve opens, the pressure in chamber 10 of the actuator 3 will rise up to the pressure of the atmosphere.

That is to say, the control valve 8 illustrated in FIG. 6 comprises three positions in principle, namely one position in which the vacuum valve and atmosphere valve are closed, as well as two other positions in which either the vacuum valve or the atmosphere valve is opened, and a variation of the respective opening cross-section is possible by a corresponding relative movement of slide 11 and housing 60.

To be able to regulate the adjusting force of the actuator 3 and/or the pressure differential loading the piston 8 of the actuator by fixing the desired value of the plunger's position, it is preferable to also have the housing 60 slidably arranged in relation to stationary parts of the braking pressure modulator 36 in addition to the slide 11.

For this purpose, there is provided a desired-value adjuster 12, e.g., a small electric motor which drives a pinion which, in turn, meshes with a spur rack 73 rigidly arranged on the housing. Accordingly, the housing 60 can be displaced in the housing's longitudinal direction. In addition, the plunger 2 of the volume-receiving unit 35 and/or a part which is in driving engagement with the plunger 2 is coupled with the slide 11 in such a manner that the slide 11 in FIG. 6 is shifted to the right when the plunger 2 shifts out of the volume-receiving unit in the shift-out direction. The arrangement functions as follows:

First, the slide 11 assumes a position relative to the housing 60 such that the collar 16 is placed roughly in the middle of the radial opening 61. Thus, the valve members 17 and 18 of the atmosphere valve and the vacuum valve are sealingly seated on the collar 16. When the desired-value adjuster 12 displaces the housing 60 in FIG. 6 to the right, while the plunger coupled to the slide 11 initially stays inactive, the valve member 17 of the atmosphere valve will ift from the collar 16 after a certain adjustment travel. As a result, the radial opening 61 as well as the chamber 10 of the actuator 3 communicating therewith are connected to the atmosphere and the difference between the pressures exerted on the upper sides and lower sides of piston 7 of the actuator decreases. As a consequence the plunger will move in the shift-out direction in the presence of comparatively low pressure in the volume-receiving unit 35, and the slide coupled to the plunger in driving terms will follow the movement of the housing 60.

In the case where the desired-value adjuster displaces the housing 60 in FIG. 6 to the left, the valve member 18 of the vacuum valve will lift from the collar 16 when there is sufficient adjustment travel so that the chamber 10 of the actuator 3 is connected with the vacuum source by way of the tubular part of the slide 11 and the chamber pressure will decrease correspondingly, while the pressure differential applied to the piston 7 of the actuator 3 rises. Due to the thereby rising adjusting force of the actuator, the plunger 2 is reset in the shift-in direction in opposition to the pressure in the volume-receiving unit 35, and the slide 11 in FIG. 6 is likewise displaced to the left and hence follows the preceded readjustment of the housing 60 by the desired-value adjuster 12. The plunger stroke following the readjustment of the housing 60 is completed as soon as the slide 11 which is engaged with the plunger 2 assumes a midposition relative to the radial opening 61, that is when both the vacuum valve and the atmosphere valve are closed.

A short-term overswing in the movement of the plunger 2 following the readjustment of the housing 60 can occur in such a way that, for instance, after an opening of the vacuum valve caused by the readjustment of the housing 60 the slide coupled to the plunger 2 will perform a stroke of such a large amount that the atmosphere valve will open slightly, which will subsequently have as a result that the plunger moves again slightly in the opposite direction and resets the slide 11 in the sense of closure of atmosphere and vacuum valves,

Overswing actions can be minimized or prevented by providing sufficient tension to the springs 22 and 23 of the valve members 17 and 18. This is particularly important when the orifice parts of the valve members 17 and 18 are dimensionsed such that a free space is present between the annular steps 24 and 25 on the inner side of the housing 60 and the parts of the valve members 17 and 18 cooperating with these steps with the collar 16 disposed in the mid-position.

Moreover, the valve members 17 and 18 have a certain damping effect. This is because the volume of the chambers 74 and 75 between the valve members 17 and 18 and the end surfaces of the housing 60 will change upon displacement of the valve members 17 and 18 in the housing 60. Thus, movements of the valve members 17 and 18 will cause pneumatic medium to flow back and forth between the sliding members 65 or 70 from the chambers 74 or 75 into the annular chamber 21. If the sliding members 65 and 70 leave open only small gaps between them, the medium flow may take place only in opposition to a certain throttling resistance which has a damping effect on the movement of the valve members 17 and 18 and thus also on the relative movements between housing 60 and the slide 11.

FIG. 7 shows a constructively favorable arrangement for integrating the control valve shown in FIG. 6 into the braking pressure modulator.

The gear unit 1, the actuator 3 as well as the volume-receiving unit 35 of the embodiment in FIG. 7 correspond substantially to the type of construction shown in FIG. 1. One difference, however, is that the tappet 42 is connected with the plunger 2 and the piston rod 46 of the actuator 3 act upon the associated levers 27 and 28 of the gear unit 1 by means of rolls in order to keep the friction as small as possible. In addition, a particularly long guidance is provided for the piston rod 46. The piston 7 of the actuator 3 is also loaded by a weak spring on its upper side which is exposed to the atmosphere. The spring is clamped in compression between a collar arranged inside the upper rim of the actuator's housing and the piston 7. The diaphragm assembly 48 of the piston 7 is designed as an annular rolling diaphragm which, on piston strokes, rolls on the inner wall of the housing of the actuator 3 or a circle-cylindrical wall disposed on the upper side of the piston. The upper frontal rim of this circle-cylindrical wall can cooperate with the collar arranged inside the upper rim of the housing of actuator 3 as a stop for limiting the piston stroke to the upper side.

A hollow cylinder 76 is located laterally on the housing of the gear unit 1 in parallel to the axis of the piston rod 46 of the actuator 3 which has directly beside the actuator housing. The hollow cylinder in turn accommodates the housing 60 of the piston control valve assembly 8 which is slidingly displaceably guided in the housing. Located within the wall of the hollow cylinder 76 or within the wall of the gear housing of gear unit 1, respectively, is a channel 77 whose one end terminates into the chamber 10 of the actuator 3 and whose other end communicates with a recess on the inner side of the hollow cylinder 76 which recess, in turn, communicates with the radial opening 61 (similar to that in FIG. 6) in the housing 60.

Arranged at an extension on the bottom front surface of the housing 60 is the spur rack 73 which cooperates with the pinion or the like of a desired-value adjuster that is not illustrated in FIG. 7 and can be formed, for example, by an electric servo motor. That is to say, the position of the housing 60 within the hollow cylinder 76 is determined by this desired-value adjuster.

The lever 28 of the gear unit 1 allocated to the plunger is designed as a double-armed lever, with the free end of the one lever arm on the plunger side being at a distance from the tilting axis of the lever 28 which is roughly twice as large as the distance between the free end of the other lever arm and its tilting axis. Consequently, on tilting of the lever 28, the free ends of the lever arms will perform different large tilting strokes, the amounts thereof having the approximate ratio of 1:2.

The one arm of the lever 28 close to the hollow cylinder 76 projects roughly into the area of the center axis of the hollow cylinder 76 and is connected to one end of a guide rod 78. The other end of the guide rod is connected to the slide 11 which is displaceably guided in the housing 60.

Owing to this arrangement, the position of the housing 60 will predefine a desired value for the position of the plunger 2. This is because as long as the plunger 2 is in a position in which the slide 11 that is drivingly engaged with the plunger keeps open either the vacuum valve or the atmosphere valve in the housing 60, the adjusting force of the actuator 3 changes in accordance with the plunger movement which causes the slide 11 within the housing to assume a position closing the vacuum valve and the atmosphere valve.

Extremely small adjusting forces are sufficient for the readjustment of the housing 60 so that both linear and rotating electromagnetic actuators are particularly apt as desired-value adjusters 12. Suitable therefor are in particular so-termed stepping motors with a step counter, because the signals of the step counter represent the respective position of the housing 60. However, since this position also corresponds to a desired nominal position of the plunger, the step counter signals also form a signal for the desired nominal position of the plunger and thus can be used as a feedback signal for the desired plunger position.

If appropriate, the desired-value adjuster 12 can also readjust the housing 60 in opposition to a resetting spring 79 that is illustrated in FIG. 6. This is advantageous in particular when an actuating drive is used which is able to generate a force only in one adjusting direction, while it is acting merely as a brake in the respective other adjusting direction.

As has been explained hereinabove, more particularly by way of FIG. 5 the piston 7 of the actuator 3 can be permanently acted upon by the constructively defined differential pressure, with the brake not applied, and consequently is able to produce a very high amount of adjusting force when the brake is not applied. As a consequence thereof the adjusting force is at first required to be decreased relatively markedly when the plunger 2 of the volume-receiving unit 35 is to be shifted out of the volume-receiving unit 35 for the purpose of braking pressure reduction. This reduction of the adjusting force which is of relatively large amount under certain circumstances will take place during the first control step according to FIG. 5.

Further it is also possible to vary the adjusting force of the actuator 3 in dependence on the pressure in the brake system in such a fashion that the plunger 2 is retained in its in-shifted end position in opposition to the pressure in the volume-receiving unit 35 as long as the brake slip control apparatus does not detect a locking wheel during braking. For this purpose, the control valve assembly 8 according to FIG. 8 can be designed as a pressure governor.

Figure 8:
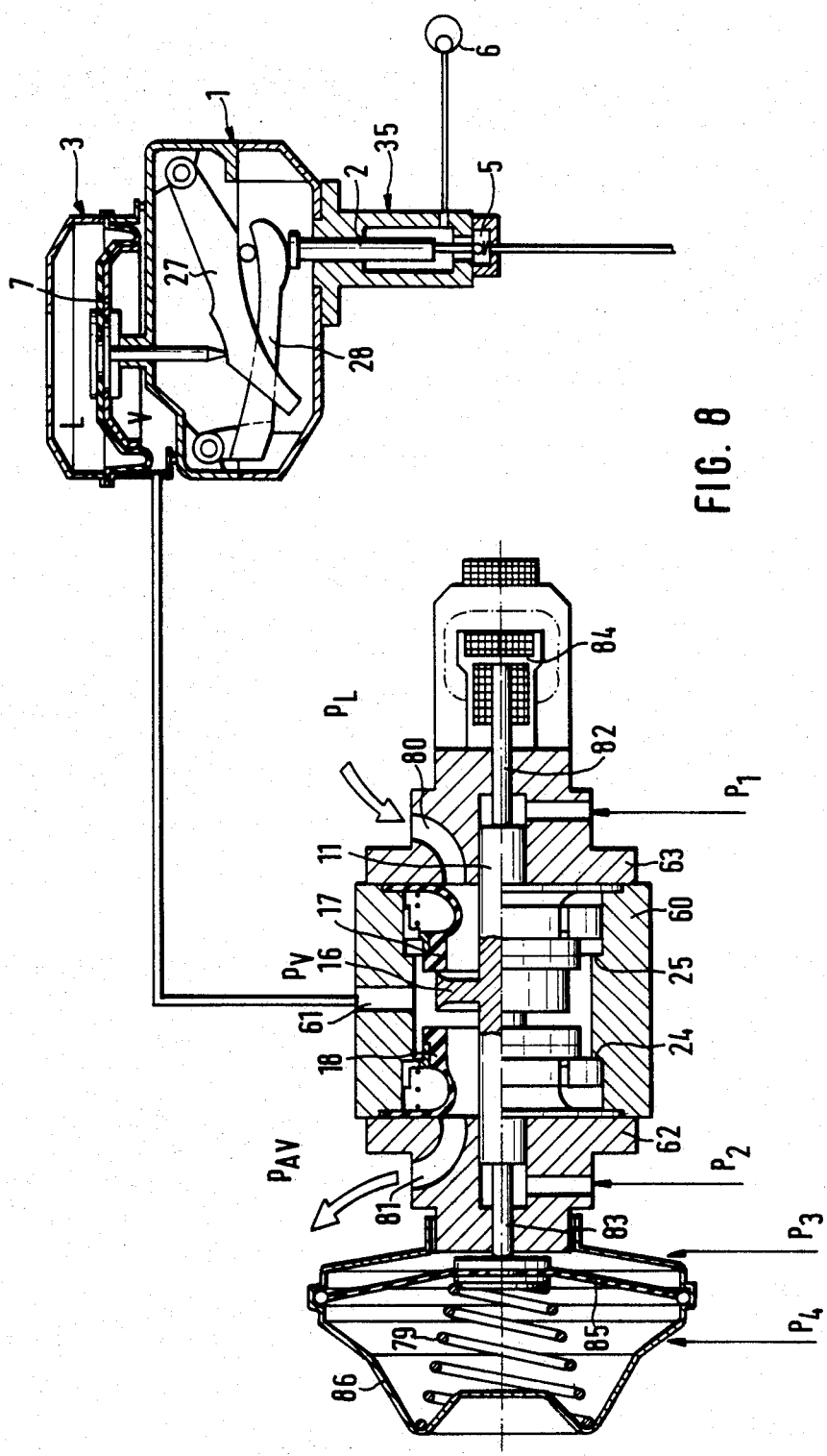
FIG. 8 is a partial schematic and cross sectional view of the control valve designed as a pressure governor in combination with the association braking pressure modulator.

In the embodiment of FIG. 8, the slide 11 is slidingly displaceably guided in guide bores of the bottom or head portions 62 and 63 in a cylindrical housing 60. The collar arranged at the slide 11 cooperates with the valve members 17 and 18 which are axially movably guided in each case laterally of the annular steps 24 and 25 which act as stops, and which valve members are clamped in the direction of the collar 16 by means of their valve springs. Deviating from the embodiment of FIG. 6, in the control valve assembly illustrated in FIG. 8, the slide 11, the valve members 17 and 18 as well as the housing 60 and the bottom parts 62 and 63 are designed or arranged largely symmetrically in relation to a medium radial plane penetrating the collar 16 or, respectively, to a radial plane penetrating the housing's middle.

The bottom part 63 houses a channel 80 which connects the annular chamber 19 to the atmosphere. A similar channel 81 is located in the bottom part 62 for connecting the annular chamber 20 to the vacuum source.

In turn, the radial opening 61 in the housing 60 communicates with the chamber 10 of the actuator 3.

At the frontal ends of the slide 11, there are arranged rods 82 and 83 which, by forming annular steps, extend the slide 11 and, in turn, are sealedly, yet slidingly displaceably guided in guide bores of the bottom parts 62 and 63.

The annular chambers which are established in front of the annular steps between the slide 11 and the rods 82 and 83 in the bottom parts 62 and 63 comprise outwardly extending hydraulic ports $P_1$ and $P_2$ which allow hydraulic pressurization of the annular chambers so that the slide 11 is urged to the left when a pressure is at port $P_1$ that is in excess of the pressure at port $P_2$, or is clamped to the right if the higher hydraulic pressure is at port $P_2$.

Rod 82 is coupled with the adjusting member of an electromagnet 84 which is disposed on the bottom part 62. Rod 83 is fastened to a piston and diaphragm assembly 85 which subdivides a box 86 into two chambers and is clamped by the resetting spring 79 to the right in FIG. 8 against the electromagnet 84. Chambers which are subdivided in housing 86 by the piston and diaphragm assembly 85 include the pneumatic ports $P_3$ and $P_4$ so that a corresponding adjusting force will be exerted in one or the other direction on the piston and diaphragm assembly 85 and thus on the slide 11 in the presence of varying pneumatic pressures at these ports.

Figures 9, 11:
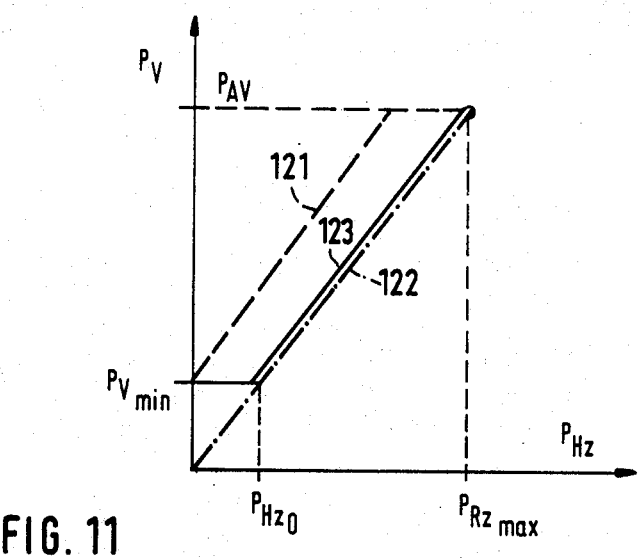
FIG. 9 is a chart showing alternative connections between the ports of the control valve illustrated in FIG. 8.
FIG. 11 shows two representative operating characteristic curves of the adapter valve illustrated in FIG. 10.

The ports $P_1$ to $P_4$ can be connected in different ways. Alternatives are shown in FIG. 9. Accordingly, non-illustrated connecting lines to the wheel brake cylinder or to the master brake cylinder provide for the pressure $p_{Rz}$ of the wheel brake cylinder or the pressure $p_{Hz}$ of the master brake cylinder to be present in the respective annular chambers through ports $P_1$ and $P_2$. If desired, one of these ports may also be pressureless. The ports $P_3$ and $P_4$ can be connected with the chamber 10 of the actuator 3 or with the vacuum source, or can connect to respective chamber solely with the atmosphere so that the same pressure $p_v$ in chamber 10, the same pressure $p_{AV}$ on the suction side of the vacuum source of the pressure of the atmosphere $p_L$ exists at the ports or, respectively, in the chambers of the box 86 connected thereto. Essentially, this arrangement functions as follows:

As long as brake slip control does not detect a locking wheel, the electromagnet 84 is not energized and does not take any influence on the position of the slide 11.

The hydraulic forces acting upon the annular surfaces on the ends of slide 11 coupled to the rods 82 and 83 as well as the pneumatic forces acting upon the piston and diaphragm assembly 85 cause the difference in pressure between the upper side and lower side of the piston 7 of the actuator 3 to rise or fall with the pressure $P_{Hz}$ of the master cylinder or the pressure $p_{RZ}$ of the wheel brake cylinder, respectively. The compression of the resetting spring 79 predefines a minimum differential pressure at the piston 7. The adjusting force of the actuator 3 will vary corresponding to the difference in pressure at the piston 7.

As soon as the brake slip control apparatus detects a locking wheel, the electromagnet 84 will be energized so that the slide 11 is sufficiently readjusted to cause shift-out of the plunger 2 out of the volume-receiving unit 35 by way of decreasing the adjusting force of the actuator 3.

Figure 10:
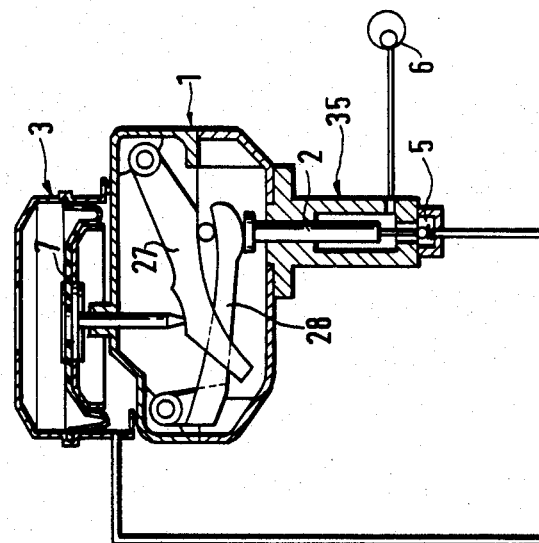
FIG. 10 showing details of construction of an adapter valve.
Figure 10:
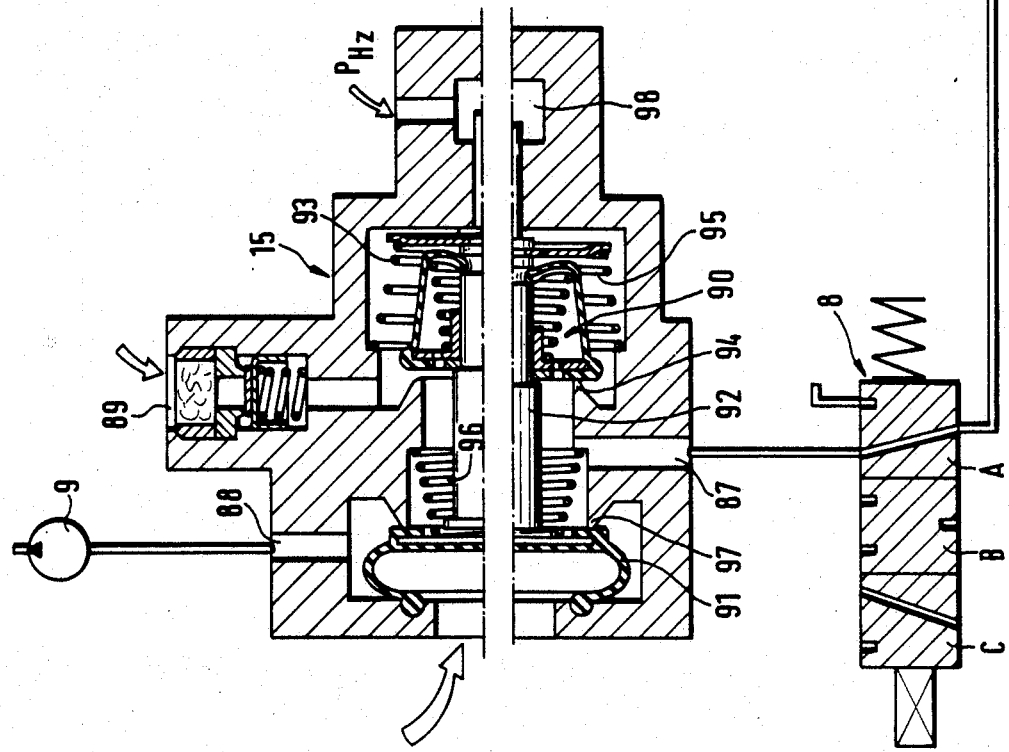

According to FIG. 10, it is possible to insert between the control valve assembly 8 and the vacuum source 9 an adapter valve 15 which serves to adapt the vacuum available at the vacuum port of the control valve assembly 8 in dependence upon the pressure in the brake system, in particular the pressure $p_{Hz}$ in the master brake cylinder. Again, this allows for limiting the adjusting force of the actuator 3. That is the actuator 3 generates in each case an adjusting force which is only slightly in excess of that adjusting force which is necessary to keep the plunger 2 in the in-shifted end position in opposition to the respective pressure in the volume-receiving unit 35, as long as brake slip control does not detect a locking wheel.

The adapter valve 15 is a valve assembly which provides for connecting the vacuum port of the control valve assembly 8 with the atmosphere or with the vacuum source, or to isolate it from both. That is to say in dependence upon the respective pressure $p_{Hz}$ in the brake system.

The housing of the adapter valve 15 illustrated in FIG. 10 includes a port 87 for the vacuum port of the control valve assembly 8, a port 88 for the vacuum source as well as port 89 for the atmosphere. A spring-loaded non-return valve is arranged in the atmosphere port 89 which permits atmospheric air to enter into the housing only if a vacuum is present in the housing which exceeds the resetting force of the non-return valve. An atmosphere valve 90 is disposed between the port 87 for the control valve assembly 8 and the atmosphere port 89, and a vacuum valve 91 is arranged between the vacuum port 88 and the port 87.

The valve member and/or the closing member of the atmosphere valve 90 is arranged on a tappet 92 which is urged to the right by a resetting spring 93 in FIG. 10. Upon displacement of the tappet 92 to the left, the valve member and/or the closing member of the atmosphere valve 90 will seat on its seat 94, the atmosphere valve 90 being closing thereby. The tappet 92 is able to displace still further to the left even after the atmosphere valve 90 is closed, and a spring 95 is increasingly compressed which clamps the parts of the valve member and/or the closing member of the atmosphere valve 90 cooperating with the valve seat 94 against an annular step which is provided at the tappet 92.

The valve member and/or the closing member of the vacuum valve 91 has a side which faces the tappet 92 which is loaded by an opening spring 96 and is urged away from the valve seat 97 of the vacuum valve 91. On its other side, the valve member and/or the closing member of the vacuum valve 91 is acted upon by the atmosphere.

The vacuum valve 91 tends to close as soon as the difference between the pressure of the atmosphere and the pressure acting upon the valve-seat sided surface of the valve member and/or closing member of the vacuum valve 91 is sufficiently high to overcome the force of the opening spring 96. However, if necessary, closing of the vacuum valve 91 can be prevented by the tappet 92 assuming a position in which it advances sufficiently far toward the vacuum valve 91. Also, the tappet 92 can also push open the closed vacuum valve 91.

The tappet movements are governed by the pressure $p_{Hz}$ in the brake system. For this purpose, the right-hand end of the tappet 92 in FIG. 10 is furnished with an axial extension which forms a plunger projecting into a chamber 98 and is applied by the pressure $p_{Hz}$ since the chamber 98 is in communication with the brake system.

The illustrated adapter valve 15 operates as follows:

With the vehicle brake not operated, the tappet 92 assumes the position illustrated in FIG. 10 and the atmosphere valve 90 is opened. The vacuum source 9 produces in the chamber between the valve seats 94 and 97 a certain vacuum relative to the pressure of the atmosphere, with the vacuum valve 91 still being opened. This is possible because the non-return valve arranged in the atmosphere port 89 is loaded by its spring to close. As soon as this vacuum reaches a certain value, the vacuum valve 91 will close in opposition to the force of its opening spring. Should the pressure rise in the chamber between the valve seats 94 and 97 due to leakage or the like, the vacuum valve 91 will be opened again by its opening spring 96 so that the vacuum source 9 is able to again produce the weak vacuum in the chamber between the valve seats 94 and 97 which is necessary to close the vacuum valve 91.

As soon as the pressure $p_{Hz}$ rises on account of an application of the vehicle brake, the tappet 92 will displace to the left so that the atmosphere valve 90 which was open at first will close. Upon further rise of the pressure $p_{Hz}$, the tappet 92 will be displaced still further to the left so that it pushes open the vacuum valve 91 and the vacuum source 9 is able to produce a boosted vacuum in the chamber between the valve seats 93 and 97. In consequence thereof, an increased force is exerted in the closing direction on the valve member and/or the closing member of the vacuum valve 91 in such a fashion that the vacuum valve 91 shifts back the tappet 92 somewhat to the right and closes. Upon further increase of the pressure $p_{Hz}$, the tappet 92 is again displaced to the left and again opens the vacuum valve, which results in further boosting of the vacuum in the chamber between the valve seats 94 and 97 and causes the vacuum valve 91 to re-assume its closed position. Consequently, the vacuum in the chamber between the seats 94 and 97 is increasingly adapting to the vacuum of the vacuum source on the suction side when the pressure $p_{Hz}$ in the brake system increases. Thus, the acutator 3 is permitted to produce an increased adjusting force when the control valve assembly 8 is correspondingly controlled.

Upon termination of brake actuation, the pressure $p_{Hz}$ will drop, the result being that the resetting spring 93—in the closed position of the atmosphere valve 90 still assisted by the spring 95—pushes the tappet 92 to the right so that the atmosphere valve 90 opens and the vacuum in the chamber between the valve seats 94 and 97 is decreased to an amount that is predetermined by the strength of the closing spring of the non-return valve arranged in the atmosphere port 89.

The characteristic curve 121 in FIG. 11 shows how the vacuum $p_v$ at the port 87 of the adaptor valve 15 changes in dependence on the pressure $p_{Hz}$ in the brake system. Even in the event of infinitely low pressure $p_{Hz}$, the vacuum has a minimum amount of $p_{Vmin}$. This vacuum increases linearly when $p_{Hz}$ rises until a maximum vacuum $p_{av}$ is present, this is the vacuum assigned to the constructively defined differential pressure $\Delta p_{Av}$. That is, when the vacuum $p_{AV}$ is prevailing at the port 87 of the adapter valve 15, the constructively defined differential pressure $\Delta p_{AV}$ can be maintained between the upper side and the lower side of the piston 7 of actuator 3.

The characteristic curve 121 extends in parallel to the characteristic curve 122 which in each case indicates the minimum amount of the vacuum $p_v$ which is needed to generate with the actuator 3 an adjusting force sufficient to keep the plunger 2 in the in-shifted position at the respective pressure $p_{Hz}$ prevailing in the volume-receiving unit 35.

It follows that, when the adapter valve 15 behaves in accordance with the characteristic curve 121, there is always at disposal a certain surplus in vacuum which keeps the plunger 2 in its in-shifted initial position and thus also compensates for a time phase displacement in the pressure variation between $p_{Hz}$ and $p_V$.

If necessary or desired, however, it is likewise possible to achieve a behavior according to the characteristic curve 123 by differently adapting the springs, in particular the spring 95 of the adapter valve 15. In this instance, a surplus in vacuum is available only if the pressure in the brake system is below a threshold value $p_{HzO}$. A behavior according to the characteristic curve 123 can be favorable inasmuch as the vacuum requirement is reduced.

Just like designing the control valve assembly 8 as pressure governor (see FIG. 8), the arrangement of an adapter valve (see FIG. 10) offers the advantage that possible dead times in braking pressure modulation are minimized. This is due to the fact that the first control step (see FIG. 5) is deleted or is shortened considerably. Moreover, the volume requirement is reduced.

Figure 12:
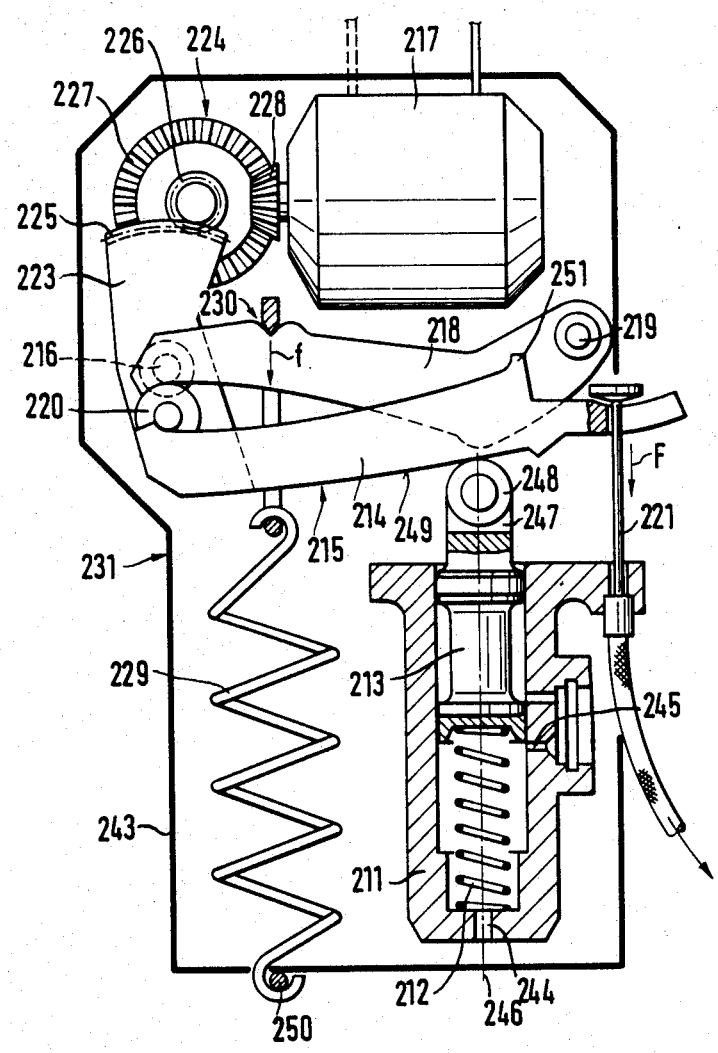
FIG. 12 is a partial cross sectional side view of a braking pressure modulator showing details of construction.

According to FIG. 12, the volume-receiving unit 211 of a hydraulic wheel-brake circuit of an automotive vehicle is incorporated in a housing 243 and includes a piston 213 which is biased by a resetting spring 212 in the direction of brake release. The assigned brake circuit is hydraulically connected to the interior of the volume-receiving unit 211 through a bore 244 provided in the bottom. Directly ahead of the front end of the piston 213 in its inactive position, there is a breathering bore 245 in the volume receiving unit 211 connected to a non-illustrated supply and refill reservoir. In its normal position, the supply and refill reservoir is easily accessible from outside of the housing 243.

The piston tappet 247 projects upwardly from the volume-receiving unit 211 and is provided at its upper end with a cam 248 which is in engagement with the lower sliding surface 249 of the outlet lever arm 214 of a roll-on curve lever gear 215. At its end remote from the cam 248, the outlet lever arm 214 is supported in a joint 216 that is tiltable about an axis that is perpendicular to the drawing plane. The arm is designed as a bell crank lever whose angular part 223 projects upward beyond the joint 216 and is provided with a toothed-wheel segment 225 which is in driving engagement with a pinion 226. Pinion 226, which is of relatively small diameter, is in anti-torsion connection with a coaxial spur gear 227 which, in turn, is acted upon by a bevel gear 228 that is seated on the axis of a stepped electric motor 217.

At its end remote from the joint 216, the inlet arm 218 of the roll-on curve lever gear is by means of its joint 219 rotatably supported on the housing 243. The joint's axis is perpendicular with the drawing plane. Interposed between the two arms 214, 218 is the gear roll 220 which is in engagement with both arms.

In the end area of the inlet arm 218 remote from the joint 219, there is provided of a knife-edge bearing 230 which is coupled to a steel tension spring 229 which is fixed in the lower area of the housing 243 by means of a cross pin 250 and which is thereby under bias. The bias serves to apply through the knife-edge bearing 230 an inlet force in the direction of the arrow f on the inlet arm 218 of the roll-on curve lever gear 215.

The steel tension spring 229 is accommodated in the housing 243 in parallel to the volume-receiving unit 211.

At the extreme end of the outlet lever arm 214 of the roll-on curve lever gear 215, which end is remote from the joint 216, the end of a hand-brake bowden cable 221 is engaged so that a tension force can be exerted on the extreme end of the outlet lever arm 214 when the hand brake is drawn in the direction of the arrow F.

In the position illustrated in FIG. 12, the piston 213 of the volume-receiving unit 211 is in the unbraked position. Since the gear roll 220 of the roll-on curve lever gear is in vertical alignment with the joint 216, the steel tension spring 229 is unable to exert any force on the tappet 247 of the piston 213 of the volume-receiving unit 211 through the knife-edge bearing 230.

If, however, the stepped motor 217 is now turned in such direction that, by way of the gear 224, the outlet lever arm 214 is swivelled clockwise, the gear roll 220 in FIG. 12 will displace to the right, as a consequence thereof the knife-edge bearing 230 exerts a constantly increasing force on the piston 213 in the downward direction through the inlet arm 218, the gear roll 220 and the outlet lever arm 214. the actuation of the angular part 223 by way of the toothed segment 225 requires but low control forces.

The bowden cable 221 is arranged at the outlet lever arm 214 in such a manner that clockwise tilting of the outlet lever arm 214 is not inhibited by the stationary bowden cable 221.

The gear roll 220 is located in the area of the end stop 215 of the outlet lever arm 214, in which location the maximum force is exerted on the cam 248 through the knife-edge bearing 230. This condition represents the state of the maximum brake force being exerted on the respective wheel brake circuit.

For brake release, the stepped motor 217 is actuated in the opposite direction, and the actions described will take place in the reverse order. It is ensured by suitably adapting the inner roll-on curves of the two arms 214, 218 that the braking pressure modulator will automatically return to its initial position in case the electrical driving energy fails. In this event, the spring 212, 229 are of special significance.

The inventive design reduces the amount of driving energy to a faction when compared with conventional systems.

The present invention afords a major advantage that there is a large transmission between the measured value desired (namely the stroke of the piston 213) and the movement at the sensor (namely the angle of rotation of the electric motor 217), the said transmission rendering the measurement more precise, without requiring the geometrical sensor-signal resolution to be extremely high.

Figure 13:
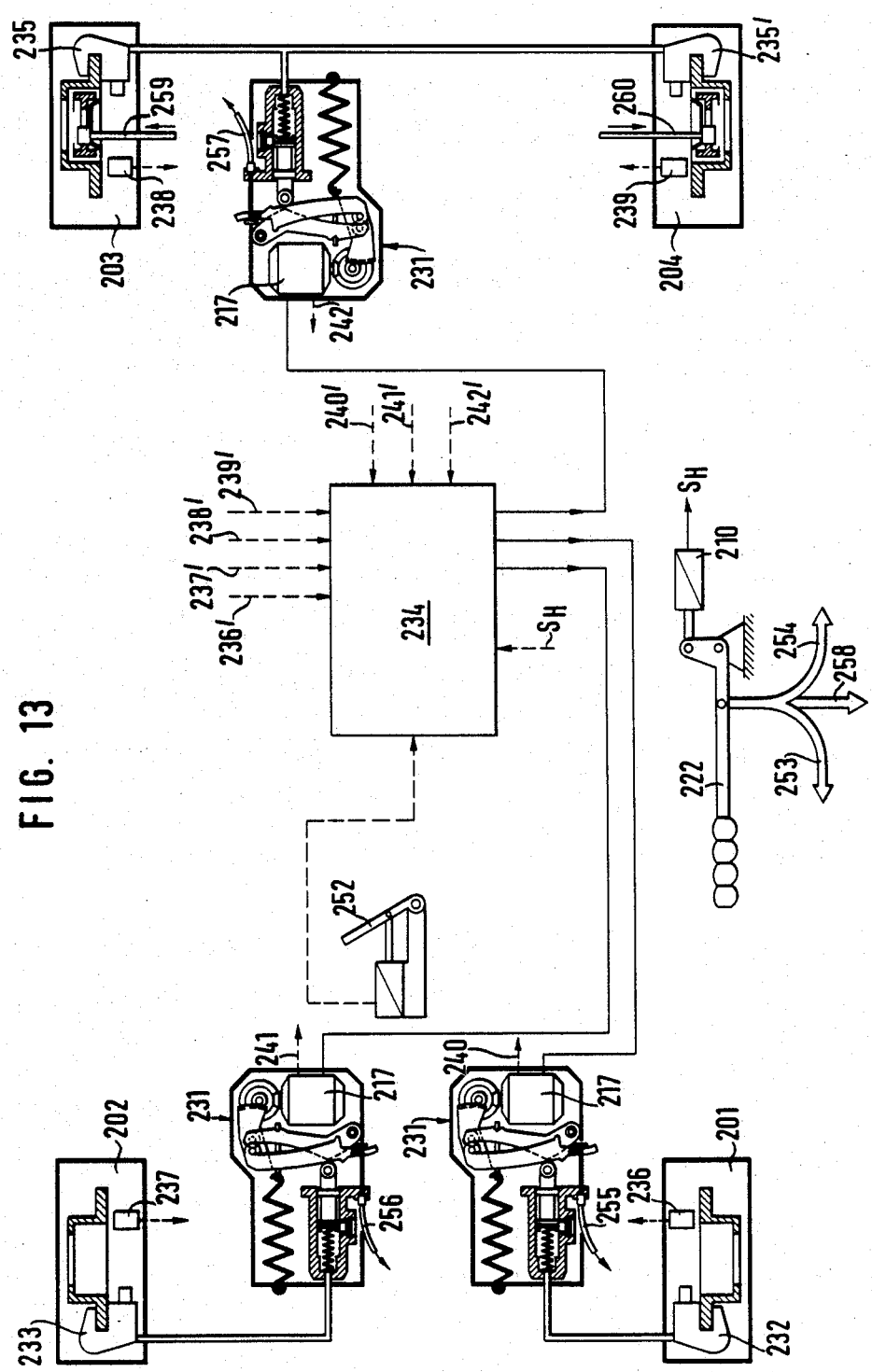
FIG. 13 is a schematic view of a vehicular brake system with three built-in braking pressure modulators according to the invention.

According to FIG. 13, three braking pressure modulators 231 of the type illustrated in FIG. 12 are arranged in the brake system of an automotive vehicle. One braking pressure modulator 231 each is provided for the two front-wheel brake circuits 201, 202 and their wheel brake cylinders 232, 233. The stepped motors 217 are actuated by an electronic brake control device 234.

Only one joint braking pressure modulator 231 each is provided for the two rear-wheel brake circuits 203, 204 and the associated wheel brake cylinders 234, 235', the modulator's stepped motor 217 being likewise actuated by the electronic brake control device 234.

The four wheels are provided with brake slip sensors 236, 237, 238 and 239, respectively, which deliver brake-slip control signals 236', 237', 238', 239' to the brake control device 234.

Moreover, the brake pedal 252 is coupled to the brake control device 234.

The actual position of the stepped motors 217 is signalled to the brake control device 234 through electrical connections 240, 240'; 241, 241'; 242, 242' so that, accordingly, the control action can be terminated when the stepped motors 217 have assumed the positions predefined by the brake pedal or the brake slip sensors, respectively.

Bowden cables 253, 254 lead from the hand brake 222 to the corresponding connections 255, 256, 257 at the braking pressure modulators 231. In addition, a connection 258 of the hand brake can lead directly to hand brake devices 259, 260 at the two rear wheels 203, 204.

When the hand brake lever 222 is actuated, inventively, a travel indicator 210 is applied which issues a signal $S_H$ to the brake control device 234, the latter evaluating this signal and providing support of the hand brake actuation by the electric motor 217.

The number of steps made by the stepped motor 217 is a direct measure of the tilting angle of the outlet lever arm 214 and thus the travel of piston 213 or the pressure in volume-receiving unit 211. Hence, predefined pressures can be reproduced and differences in pressure can be adjusted which is of special advantage for all types of braking-pressure control and regulation operations. If, however, a stepped motor is not used, e.g., for cost reasons, the same effect can also be achieved by means of a rotational-position sensor which is mounted on the shaft of the electric motor, for instance.

In principle, all described embodiments of this invention are characterized in that, in comparison with prior art braking pressure modulators, there is need for an extremely small vacuum suction capacity of the vacuum source.

In order to perform a full plunger storke in a time interval of about 50 millisecs, a vacuum suction capacity of the vacuum source of 1.8 l/sec will suffice. Consequently, the inventive braking pressure modulator lends itself to being used in combination with such vehicle engines which are able to produce but little vacuum which can be utilized as a vacuum source.

What is claimed is:

1. A braking pressure modulator comprising a volume-receiving unit including a displacement member in a working chamber, said volume receiving unit hydraulically interposed between a master brake cylinder and a wheel brake cylinder of a brake system, said volume receiving unit adapted to be uncoupled form the master brake cylinder by a separating valve coupled to said volume-receiving unit which separating valve closes automatically when the displacement member moves from one end position in said working chamber where at said displacement member modulates the pressure in the working chamber and wheel brake cylinder, an actuator including an adjusting member that is coupled to the displacement member by a gear unit having a transmission characteristic driven by a piston and diaphragm assembly operatively connected thereto, said piston and diaphragm assembly responsive to a pressure difference across said piston and diaphragm to generate an adjusting force that is dependent on the difference in pressure wherein the transmission of the gear unit varies in such a manner that a defined adjusting force of the actuator will be generated by a predetermined value of said differential pressure and said gear unit urges the displacement member in the direction of its one end position to modulate said pressure, said gear unit adapted to provided that forces acting on the displacement member or urging the displacement member in a direction toward an end position opposite said one end position remain substantially in a condition of balance with the adjusting force irrespective of the position of the displacement member when the displacement member leaves its one end position and begins movement in the opposite direction upon a predetermined maximum pressure being attained in the working chamber with the separating valve closed.

2. The braking pressure modulator as claimed in claim 1, wherein the predetermined maximum pressure is above a maximum pressure in the working chamber and the wheel brake cylinder connected thereto, said volume displacement unit adapted to decrease said maximum pressure to an infinitely low residual pressure with a predefined largest possible stroke of the displacement member after the separating valve is closed.

3. The braking pressure modulator as claimed in claim 1, wherein the differential pressure across the piston and diaphragm assembly of the actuator is controlled by a control valve assembly connected between said actuator and a vacuum source, said pressure differential variable between an infinitely low differential pressure and a value corresponding to at least the predetermined differential pressure.

4. The braking pressure modulator as claimed in claim 1, wherein the piston and diaphragm assembly of the actuator has one side thereof constantly exposed to atmospheric pressure and confines a chamber arranged on its other side, said chamber alternatively connectable with a pressure or vacuum source wherein said pressure source includes an auxiliary pressure source or atmosphere, the said chamber being connected to a control valve assembly for controlling the chamber pressure.

5. The braking pressure as claimed in claim 4, wherein said control valve assembly is a three-way/three-position directional control valve having a first port connected to the actuator chamber, a second port opening to atmospheric air and a third port connected to the vacuum or pressure source, said valve adapted to isolate the chamber from the atmosphere as well as from the vacuum or pressure source in one switch position, and to connect said chamber either to the vacuum or pressure source, including the atmosphere, in the other two switch positions.

6. The braking pressure as claimed in claim 5, including means to regulate the differential pressure including means for fixing a predefined desired value of the stroke of the displacement member, said means for fixing includes a control valve housing movably arranged in relation to a stationary part of said volume displacement unit, said control valve housing being coupled in driving engagement with a desired-value adjuster and a control member of said control valve being drivingly engaged with the displacement member in such a fashion that, in the event of readjustment of the control valve housing as caused by the stroke of the desired-value adjuster, due to a changed adjusting force of the actuator, the displacement member is urged in the same direction of movement as the control valve housing relative to the stationary part of said volume displacement unit.

7. The braking pressure modulator as claimed in claim 6, wherein the control member of the control valve is coupled directly with an actuating drive.

8. The braking pressure modulator as claimed in claim 6, wherein the control member of the control valve defines a pressure governor having effective surfaces that are exposed to the wheel-brake cylinder pressure as well as the pressure in the actuator, said control member is controllable by the pressure forces applied to the effective surfaces in such a sense that the pressure differential acting upon the piston and diaphragm assembly of the actuator will rise or fall with the wheel cylinder pressure when the modulator is not operated.

9. The braking pressure modulator as claimed in claim 5, including an adapter valve means connected between the vacuum or pressure source and the third port of the control valve leading thereto, the said adapter valve means being controllable in dependence upon the pressure in the master brake cylinder or in the wheel brake cylinder and adapted to close or throttle the connection between the vacuum or pressure source and the third port of the control valve and to open a connection of said third port to the atmopshere in a controllably throttling manner.

10. The braking pressure modulator as claimed in claim 5, wherein the actuator generates a minimum adjusting force even when the brake is not applied.

11. The braking pressure modulator as claimed in claim 9, wherein in the presence of an infinitely low pressure in the wheel brake cylinder or the master brake cylinder, there is maintained a minimum vacuum at the port of the adapter valve connected to the control valve when the vacuum source is connected to the adapter valve and, respectively, a minimum pressure is maintained at the port of the adapter valve connected to the control valve when the pressure source is connected to the adapter valve.

12. The braking pressure modulator as claimed in claim 11, wherein the vacuum or the pressure, respectively, at the third port of the control valve rises without delay in the event of rising pressure in the wheel brake cylinder or in the master brake cylinder respectively.

13. The braking pressure modulator as claimed in claim 11, wherein in the event of rising pressure in the wheel brake cylinder or in the master brake cylinder, respectively, the vacuum or the pressure, respectively, at the third port of the control valve rises above a threshold value.

14. The braking pressure modulator as claimed in claim 4, wherein the housing of the control valve incorporates a displaceable rod-shaped slide having an annularly encompassing collar, said slide, by way of end faces thereof remote from each other, cooperates with two annular valve members defining a double-seated valve seat, a first annular chamber being between one of the valve members and the slide on one side of the collar and communicates with a first port opening to the atmosphere or other pressure source, a second annular chamber between the second valve member and the slide on the other side of the collar and communicating with a second port connecting to a vacuum source or the atmosphere, and a third annular chamber enclosing the collar and the two valve members communicating with a third port connected to the actuator chamber, both valve members are slidably disposed and, by means of springs, are clamped against stops on the valve housing, the valve members in a mid-position of the slide simultaneously are in sealing abutment on the valve seat, one valve member lifts from the valve seat and connects the third annular chamber with one of the other two annular chambers when the slide is displaced sufficiently far in relation to the respectively other valve member.

15. The braking pressure modulator as claimed in claim 14, wherein the annular chamber as well as the valve members are symmetrically arranged with the collar disposed in the mid-position.

16. The braking pressure modulator as claimed in claim 15, wherein at least on one side of the collar, the slide is designed as a tube connectable with the vacuum source or atmosphere, said tube terminates into the second annular chamber through openings provided on one side of the collar.

17. The braking pressure modulator as claimed in claim 15, wherein the slide is designed as a rod of small diameter on one side of the collar and as a tube of larger diameter on the other side of the collar, the large diameter tube terminating into an annular chamber on the side of the collar close to the rod through openings disposed radially inbetween the collar and rod.

18. The braking pressure modulator as claimed in claim 17, wherein the valve member arranged on the side of the collar close to the tube is sealed by means of a bellows at the housing of the control valve, with the port for the atmosphere or pressure source being connected to the annular chamber on the tube-side of bellows and valve member, the valve member disposed on the rod-side of the collar is sealed by means of a bellows at a distance from the collar at the rod, and the rod is sealed by means of bellows at the housing of the control valve on the side of the bellows remote from the collar.

19. The braking pressure modulator as claimed in claim 4, including a lever gear unit having a pair of levers tiltable about parallel axes spaced from each other, said levers being directed with their free ends in each case in the direction of the axis of the respectively other lever and acting upon each other by means of a roller element interposed between them, said roller element rolls on facing inward roll-on curves on the flanks of each lever and, when the levers are stressed toward each other, the roller assumes a stable position predefined by concave bends of the roll-on curves on the roller side of the levers, one lever being drivingly engaged with the displacement member, the other lever is drivingly engaged with the piston and diaphragm assembly of the actuator.

20. The braking pressure modulator as claimed in claim 19, wherein the displacement member and the diaphragm and piston assembly act upon the levers by means of tappet-like elements which cooperate with outwardly curved tracks on the levers in the form of circular involutes.

21. The braking pressure modulator as claimed in claim 20, wherein the piston and diaphragm assembly of the actuator is arranged on the roller-side of the lever connected to said actuator, said actuator coupled with a tappet element by a tension member, said tappet element acts upon the lever on the side thereof remote from the roller element.

22. The braking pressure modulator as claimed in claim 21, wherein the lever operatively associated with the displacement member is designed as a double-arm bell crank lever whose one arm cooperates with the roller element and whose other arm cooperates with a tappet arranged at the displacement member.

23. The braking pressure modulator as claimed in claim 22, wherein the displacement member and the associated tappet are disposed substantially transversely to the tension member on that side of the assigned lever arm that is remote from the tension member.

24. The braking pressure modulator as claimed in claim 23, wherein the lever cooperating with the displacement member is coupled with the control member of the control valve, said control member housing is displaceable by a desired-value adjuster.

25. The braking pressure modulator as claimed in claim 24, wherein the volume-receiving unit is coupled to the wheel brake cylinders.

26. The braking pressure modulator as claimed in claim 25, wherein the piston of the volume-receiving unit is biased by a resetting spring into an inactive position and is acted upon by the end of an outlet lever arm of a roll-on curve lever gear at a location remote from the location on said lever arm where at a control force generated by an electric motor acts and a predetermined inlet force acts in the direction of the gear roll on the inlet arm of the roll-on curve lever gear at the end remote from a pivtoable attachment joint of said arm.

27. The braking pressure modulator as claimed in claim 26, wherein a bowden cable of a hand brake engages the end of the outlet lever arm of the roll-on curve lever gear in a direction for compressing the resetting spring, the arm's end being remote from the pivtoable attachment joint.

28. The braking pressure modulator as claimed in claim 27, wherein the outlet lever arm is designed as a bell crank lever, and includes an angular part projecting from the attachment joint, a torque applied by the electric motor and a gear to said part around the joint.

29. The braking pressure modulator as claimed in claim 28, wherein at its end remote from the joint, the angular part is designed as a toothed-wheel segment into which a pinion driven by the electric motor is engaged.

30. The braking pressure modulator as claimed in claim 29, wherein each brake circuit includes a separate braking pressure modulator including a volume-receiving unit, a roll-on curve lever gear, a gear unit and an electric motor.

31. The braking pressure modulator as claimed in claim 30, wherein each braking pressure modulators are controlled by an electronic brake control device, to which the brake pedal and the brake slip sensors are connected.

* * * * *